US012742065B2

(12) United States Patent
Periyasamy et al.

(10) Patent No.: US 12,742,065 B2
(45) Date of Patent: Sep. 22, 2026

(54) POLYMER AND ELASTOMER COMPOSITIONS HAVING CARBON NANOSTRUCTURE ADDITIVES AND ARTICLES FORMED THEREFROM FOR USE IN EMI AND RFI SHIELDING AND IN PRESSURE SENSING SEALS HAVING QUANTUM TUNNELING COMPOSITE EFFECTS

(71) Applicant: Greene, Tweed Technologies, Inc., Wilmington, DE (US)

(72) Inventors: Mookkan Periyasamy, Wilmington, DE (US); Carmen J. Quartapella, Collegeville, PA (US); Nicholas P. Piacente, Rockville, MD (US); Brian Lynn, Green Lane, PA (US)

(73) Assignee: Greene, Tweed Technologies, Inc., Wilmington, DE (US)

( * ) Notice: Subject to any disclaimer, the term of this patent is extended or adjusted under 35 U.S.C. 154(b) by 0 days.

(21) Appl. No.: 18/163,874

(22) Filed: Feb. 3, 2023

(65) Prior Publication Data

US 2023/0183467 A1 Jun. 15, 2023

Related U.S. Application Data

(63) Continuation of application No. 17/545,580, filed on Dec. 8, 2021.

(60) Provisional application No. 63/122,911, filed on Dec. 8, 2020.

(51) Int. Cl.

| | |
|---|---|
| ***C08L 27/20*** | (2006.01) |
| ***C08K 3/04*** | (2006.01) |
| ***C08L 71/00*** | (2006.01) |
| ***H01F 27/36*** | (2006.01) |
| ***H01Q 1/52*** | (2006.01) |

(52) U.S. Cl.

CPC .............. *C08L 27/20* (2013.01); *C08K 3/041* (2017.05); *C08L 71/00* (2013.01); *H01F 27/363* (2020.08); *H01Q 1/526* (2013.01); *C08L 2203/20* (2013.01)

(58) Field of Classification Search

CPC ...................................................... C08K 3/041

See application file for complete search history.

(56) References Cited

U.S. PATENT DOCUMENTS

| | | | | |
|---|---|---|---|---|
| 5,284,888 | A | 2/1994 | Morgan | |
| 6,495,069 | B1 | 12/2002 | Lussey et al. | |
| 6,646,540 | B1 | 11/2003 | Lussey | |
| 6,863,942 | B2 | 3/2005 | Ren et al. | |
| 6,902,688 | B2 | 6/2005 | Narayan et al. | |
| 6,946,513 | B2 | 9/2005 | Higashino et al. | |
| 7,022,405 | B2 | 4/2006 | Kaplo | |
| 7,145,432 | B2 | 12/2006 | Lussey et al. | |
| 7,301,435 | B2 | 11/2007 | Lussey et al. | |
| 7,425,604 | B2 | 9/2008 | Cosman et al. | |
| 7,589,284 | B2 | 9/2009 | Severance et al. | |
| 7,919,554 | B2 * | 4/2011 | Noguchi .............. | C09K 3/1009 524/496 |
| 8,362,167 | B2 | 1/2013 | Andreevich et al. | |
| 8,448,949 | B2 | 5/2013 | Stewart et al. | |
| 8,449,974 | B2 | 5/2013 | Lussey et al. | |
| 8,633,402 | B2 | 1/2014 | Bunyan et al. | |
| 8,758,892 | B2 | 6/2014 | Bergin et al. | |
| 8,765,027 | B2 | 7/2014 | Lussey et al. | |
| 9,107,292 | B2 | 8/2015 | Shah et al. | |
| 9,111,658 | B2 | 8/2015 | Shah et al. | |
| 9,133,031 | B2 | 9/2015 | Liu et al. | |
| 9,371,426 | B2 | 6/2016 | La Camera et al. | |
| 9,447,259 | B2 * | 9/2016 | Shah ........................ | C08K 9/04 |
| 9,546,859 | B2 | 1/2017 | Lussey et al. | |
| 9,635,790 | B2 | 4/2017 | Coppola et al. | |
| 9,650,501 | B2 | 5/2017 | Shah et al. | |
| 9,814,164 | B2 | 11/2017 | Dabusc | |
| 10,578,146 | B2 | 3/2020 | Etling et al. | |
| 10,629,326 | B2 | 4/2020 | Kaneko et al. | |

(Continued)

FOREIGN PATENT DOCUMENTS

| | | |
|---|---|---|
| CN | 103959395 A | 7/2014 |
| CN | 108440891 A | 8/2018 |

(Continued)

OTHER PUBLICATIONS

"ATHLOS Carbon Nanostructures," Product Guide ; Cabot; 2019, 4 pages.

"EMI Shielding: Methods and Materials," S. Geetha et al., Feb. 2009, 14 pages.

International Search Report and Written Opinion of International Counterpart Application No. PCT/US2021/062411, Apr. 12, 2022; 22 pages.

Taiwanese Office Action of Counterpart Application No. 110145855 with Translation; Jan. 16, 2024; 21 pages.

Response to Taiwanese Office Action of Counterpart Application No. 110145855 with Translation of Claims; Apr. 24, 2024; 19 pages.

Taiwanese Office Action of Counterpart Application No. 110145855 with Translation; Sep. 27, 2024; 8 pages.

(Continued)

*Primary Examiner* — Vickey Nerangis

(74) *Attorney, Agent, or Firm* — Calderone McKay LLC

(57) ABSTRACT

Compositions of at least one matrix polymer that may be a thermoplastic and/or curable polymer having at least one functional group for crosslinking for use in forming articles are disclosed as well as methods for making such articles, wherein the compositions and methods include a carbon nanostructure additive that is three-dimensional, branched and crosslinked. The resulting articles can in one embodiment provide a volume resistivity level of about 0.5 ohm-cm or less which are useful in applications requiring conductivity sufficient to provide electromagnetic interference shielding and/or radio frequency interference shielding. Other articles formed using compositions disclosed herein in other embodiments can demonstrate dissipative and/or quantum tunneling effects and so are useful as self-sensing pressure sensitive articles, such as self-sensing seals.

19 Claims, 9 Drawing Sheets

(56) References Cited

U.S. PATENT DOCUMENTS

| | | | | |
|---|---|---|---|---|
| 10,827,660 | B2 | 11/2020 | Huang et al. | |
| 2003/0213939 | A1 | 11/2003 | Narayan et al. | |
| 2005/0167133 | A1* | 8/2005 | Aisenbrey | H01Q 1/38 174/388 |
| 2009/0084600 | A1 | 4/2009 | Severance | |
| 2011/0079962 | A1 | 4/2011 | Munro et al. | |
| 2011/0253948 | A1 | 10/2011 | Lussey et al. | |
| 2012/0077935 | A1 | 3/2012 | Gurevich et al. | |
| 2012/0122020 | A1 | 5/2012 | Hata et al. | |
| 2012/0177906 | A1 | 7/2012 | Sousa et al. | |
| 2014/0093728 | A1 | 4/2014 | Shah et al. | |
| 2014/0094541 | A1 | 4/2014 | Shah et al. | |
| 2014/0109698 | A1 | 4/2014 | Lussey et al. | |
| 2014/0202744 | A1 | 7/2014 | Kobayashi et al. | |
| 2014/0221533 | A1 | 8/2014 | Hata et al. | |
| 2017/0261456 | A1 | 9/2017 | Lewicki et al. | |
| 2018/0186965 | A1 | 7/2018 | Lussey et al. | |
| 2018/0195914 | A1 | 7/2018 | Benech et al. | |
| 2019/0054718 | A1 | 2/2019 | Ito et al. | |
| 2019/0055416 | A1 | 2/2019 | Ferrari et al. | |
| 2019/0245134 | A1 | 8/2019 | Merrell et al. | |
| 2020/0172669 | A1 | 6/2020 | Song et al. | |
| 2020/0223797 | A1 | 7/2020 | Galimberti et al. | |
| 2021/0002462 | A1 | 1/2021 | Ueno et al. | |
| 2022/0306853 | A1* | 9/2022 | Reichl | C08K 3/041 |

FOREIGN PATENT DOCUMENTS

| | | | |
|---|---|---|---|
| CN | 111712538 | A | 9/2020 |
| CN | 108530676 | B | 2/2022 |
| EP | 3088460 | A1 | 11/2016 |
| EP | 2823697 | B1 | 9/2019 |
| IN | 201305538 | P1 | 12/2014 |
| IN | 201841003768 | | 8/2019 |
| JP | 2005521782 | A1 | 7/2005 |
| RU | 2724650 | C1 | 6/2020 |
| TW | 201202282 | A | 1/2012 |
| TW | 201730277 | A | 9/2017 |
| TW | 201918527 | | 2/2019 |
| TW | 202022002 | A | 6/2020 |
| WO | WO 99/38173 | | 7/1999 |
| WO | WO 2013/051707 | A1 | 4/2013 |
| WO | WO 2019/224396 | A1 | 11/2019 |
| WO | WO 2021/247153 | A2 | 12/2021 |

OTHER PUBLICATIONS

Response to Taiwanese Office Action of Counterpart Application No. 110145855 with Translation of Claims; Apr. 1, 2025; 14 pages.

Taiwanese Office Action of Counterpart Application No. 110145855 with Translation; Dec. 23, 2025; 10 pages.

Response to Taiwanese Office Action of Counterpart Application No. 110145855 with Translation of Claims; Apr. 1, 2026; 11 pages.

European Response to Rule 161 162 Notice as filed of Counterpart Application No. 21904333.8; Jan. 26, 2024; 14 pages.

Extended European Search Report and Written Opinion of Counterpart Application No. 21904333.8; Nov. 29, 2024; 9 pages.

Response to Extended European Search Report and Written Opinion of Counterpart Application No. 21904333.8; Sep. 2, 2025; 13 pages.

Japanese Voluntary Amendment of Counterpart Application No. 2023-534945; Dec. 9, 2024; 4 pages.

Japanese Office Action of Counterpart Application No. 2023-534945 with English Translation; Oct. 28, 2025; 6 pages.

Response to Japanese Office Action of Counterpart Application No. 2023-534945 with English Translation of Claims; Apr. 22, 2026; 14 pages.

Korean Office Action of Counterpart Application No. 10-2023-7023045 with English Translation; Dec. 15, 2025; 14 pages.

Singapore Search Report and Written Opinion of Counterpart Application No. 11202304360X; Feb. 14, 2026; 12 pages.

Caron Erin et al. "Cabot Corporation Expands Advanced Carbons Portfolio with New ATHLOS™ Carbon Nanostructures for Engineered Polymers," Oct. 15, 2019.

Sang Zhen et al. "Effect of Carbon Nanotube Morphology on Properties in Thermoplastic Elastomer Composites for Strain Sensors," Composites Part A, vol. 121, pp. 207-212, Doi: 10.1016/J.COMPOSITESA.2019.03.007.

* cited by examiner

POLYMER AND ELASTOMER COMPOSITIONS HAVING CARBON NANOSTRUCTURE ADDITIVES AND ARTICLES FORMED THEREFROM FOR USE IN EMI AND RFI SHIELDING AND IN PRESSURE SENSING SEALS HAVING QUANTUM TUNNELING COMPOSITE EFFECTS

CROSS-REFERENCE TO RELATED APPLICATIONS

This Non-Provisional Patent application is a continuation non-provisional Patent application claiming priority under 35 U.S.C. § 120 to U.S. Non-Provisional patent application Ser. No. 17/545,580, filed Dec. 8, 2021, entitled, entitled "Polymer and Elastomer Compositions Having Carbon Nanostructure Additives and Articles Formed Therefrom for Use in EMI and RFI Shielding and in Pressure Sensing Seals Having Quantum Tunneling Composite Effects," which claims the benefit under 35 U.S.C. § 119(e) of U.S. Provisional Patent Application No. 63/122,911, filed Dec. 8, 2020, entitled, "Polymer and Elastomer Compositions Having Carbon Nanostructure Additives and Articles Formed Therefrom for Use in EMI and RFI Shielding and in Pressure Sensing Seals Having Quantum Tunneling Effects," the entire disclosures of which are incorporated herein by reference.

BACKGROUND OF THE INVENTION

Field of the Invention

The invention relates to the field of beneficial polymer and elastomer compositions, including those formed of curable fluorinated and perfluorinated compositions, and finished products therefrom that incorporate varying levels of carbon nanostructures enabling the resulting articles, such as seals and gaskets, to provide unique electromagnetic shielding properties, especially at high loading, without significant particulation and further that allow formation of "smart" articles formed using these materials for evaluating the performance of the articles in real time when employed in various end applications, particularly in semiconductor applications, by monitoring the conductivity of the materials as a function of their bulk resistivity over time.

Description of Related Art

Conductive polymers and elastomers are known, whether including inherently conductive polymers such as polyanilines, or prepared using conductive metal or carbon powder and/or particulate fillers and/or fiber fillers, which may include metals, polymers, carbon, graphite and similar materials. Such polymers and elastomers are known for use in radio frequency interference (RFI) and/or electromagnetic interference (EMI) shielding at high filler loadings for seals, gaskets and other component shielding parts to prevent harm due to interference signals. They are also known in varying amounts for dissipative uses, such as in exterior vehicle parts where it is important to avoid sparking and fire risk by running electronic static charge from certain polymers to ground. Polymer and elastomer compositions with conductive or dissipative properties are used in various applications, however, there is still a need in the art for improvement of such materials in various end applications and for creating new and important end applications such as employing such materials for use in a cleanroom environment. Further, new fields and uses for such compositions are yet to be developed.

Various parts and components used in manufacturing, particularly those for use in semiconductor manufacturing, including slit valve and gate valve doors, and other seals and gaskets are well known. With respect to slit valve and gate valve doors, such doors close against surfaces within semiconductor manufacturing equipment with a seal or gasket to ensure that contaminants remain outside the reaction chamber and that reactants from within the chamber do not escape the chamber. However, such reaction chambers need to open and close during manufacture to allow wafers for manufacturing chips and similar target substrates to move into and out of a reaction chamber. In one preferred design, the seal for such slit and gate valves is incorporated in a bonded assembly referred to as a bonded gate valve or a bonded slit valve ("BSV"). A goal in such cases is to minimize the level of particulation as it can create contamination in the process. In some cases, as seals degrade, particles can be released and the ultimate sealing properties generally tend to erode over time. Thus, measuring the reliability of seals and minimizing particulation are highly desired properties in most semiconductor manufacturing applications.

Measuring reliability and degradation rates of seals and gaskets also is a desirable end goal in a wide variety of end applications to maximize effective production life of a seal or gasket, while minimizing the leaks or end effects of compromised seal properties due to degradation.

BSVs and other seals can be variably impacted by different reactants and different reactant conditions. Such slit valves, incorporating a door and seal, operate on a valve that actuates so as to open and close the door over the "slit" opening into the chamber. The seal is provided so as to seal around the opening or slit in the chamber and seal the chamber opening when the valve is in the closed position. When the valve is open, substrates for semiconductor manufacture are moved in and out of the process chamber through the slit.

Harsh precursors, plasmas, high-temperature and other conditions can cause different types of seals to wear at variable rates. A majority of such reaction chambers operate under vacuum conditions and use seals throughout the system to maintain the vacuum environment.

Such seals are generally formed of highly chemically-resistant elastomeric materials, that are costly to purchase, so it is understandable that one may not want to replace a seal before replacement is indicated. However, due to the variability in the impact of reactants and conditions on various elastomeric materials used to make the seals, it is not always easy to predict when a seal is compromised and/or when it will be subject to imminent failure. Elastomeric sealing properties as well as other physical properties of the materials can be tested to estimate failures in different environments and that information used to provide expected seal life information. However, with varying environments, conditions and use expectations, to be safe, one would expect to change out the seal before harm, inconsistency in product outcome or failure to a particular product occurs.

As the products made in such environments are themselves very costly to manufacture, unnecessary maintenance down time and/or failure are even more costly to a manufacturer than replacement of the seals. Thus, effective seal life is a key factor that impacts chamber up-time, use of the chamber, maintenance scheduling and product failures due to seal material degradation. The chemical, temperature and other process conditions impact the material of the seal and door and mechanical stresses occur due to valve actuation, all of which can lead to seal degradation and failure.

Such issues also arise in other industries where maintenance costs, seal cost or downtime are costly and/or where the sealing function is key to operation safety, such that seal life monitoring and timely replacement that is cost effective is important. In areas where particulation is problematic, such as in the semiconductor or pharmaceutical industries and other manufacturing clean room environments, minimizing such contamination is also important.

One way of addressing expected seal life in the prior art is testing, which can incur additional costs and/or labor. Monitors are also sometimes positioned within reaction chambers which are monitored for changing conditions within the chamber that could impact manufacture. Reactants are also monitored. Degradation is typically realized by detecting a vacuum leak or the presence of particle generation from the degrading seal material.

However, such problems can be ameliorated, cost savings achieved and failures minimized if there were a successful way to know when a seal is compromised and/or impacting the process and requires maintenance. Further, operations could be improved if there were a way to maximize seal life while avoiding the disadvantages of seal degradation as noted above.

In downhole applications in the oilfield area, seals that provide feedback are described in the prior art, for example, in U.S. Patent Publication No. 2017/0130562 A1 which teaches seals in wells and in other components used well head assemblies that embed sensors in a seal to acquire data that can be used to determine and monitor the condition of seals by monitoring physical operating conditions and the stress or strain on the seal. This data is used to determine when the seal will need to be replaced on a scheduled basis regardless of its condition. Data gathered is compared to base-line data using a data analyzer and predictive algorithms to evaluate expected performance characteristics of seals. Antennae and RFID tags or wear sensors may also be incorporated. Sensors may also be embedded in packing.

Other prior art attempts to monitor aspects of seal life, or to employ sensors and other detectors in semiconductor processing steps include, e.g., placing sensors on slit valves and sealing plates to monitor an aspect of the process, but such attempts more typically focus on monitoring the door function, door pressure or avoidance of damage to process substrates moving in and out of the door so as to ensure their proper transport and positioning within the chamber. Such patents insert or incorporate sensors in or on the seal or separated between chambers and/or inside and outside a chamber or door for monitoring pressure differentials.

U.S. Pat. No. 7,841,582 B2 describes a method and apparatus for controlling pressure on a slit valve door using an actuator to apply a different pressure to the actuator and door during cleaning as opposed to during a reaction where the internal pressure will be higher than during cleaning so that the seal is not unnecessarily under high vacuum conditions during cleaning.

U.S. Pat. No. 8,815,616 describes a slit valve unit with a housing around the slit valve and a series of packing units (O-ring seals) to make the area airtight. A small conduit communicates with the airtight area between the seals and with a sensor unit that can monitor pressure change to avoid explosion or leakage of process gas and a control unit that can shut the unit down to prevent an event.

U.S. Pat. No. 9,347,495 includes a bearing assembly formed using an RFID that has an inlet IC chip, an antenna connected to that chip and a magnetic sheet function embedded in either the bearing seal or the raceway ring.

U.S. Pat. No. 8,282,013 describes embedded RFID transponders that are centered within a seal and then vulcanized. The seals are described as thus being able to communicate through the RFID transducer which may be programmed to include information about the seal (part number, serial, batch and /or lot number, code, dimensions, date of manufacture or sale, installation and/or expiration date).

U.S. Pat. No. 7,398,692 is directed to a circuit chip attached in a united manner to an O-ring seal that has an information-transmitting means to transmit information outside the sealing ring. The chip is sandwiched in a cut in the seal body and then the cut was fixed. Wiring attached to the sensor is pulled out of the main body part and connected to a pressure measuring apparatus. The pressure monitoring is evaluated to measure internal seal stress and pull the seal from service when it reduces inner stress to 80%.

U.S. Patent Publication No. 2018/0052104 A1 describes use of a part wear indicator material that may be placed in various locations of a chamber. The wear indicator has different layers and a phosphorescent material to indicate wear.

U.S. Pat. No. 9,975,758 includes micro sensors which may be mounted on wafer processing equipment to monitor various conditions in real time. The microsensors may also be placed throughout the process chamber as well as on the tools.

U.S. Pat. No. 7,658,200 B2 discloses use of a pressure regulation system for two chambers separated by a slit valve. The purpose is to monitor the pressure differential in the chamber to avoid inadvertently opening the chamber. The patent teaches use of a pressure sensor in each chamber that communicates with a controller to prevent inadvertent opening. The sensors are not being used to monitor conditions that impact seal effectiveness.

U.S. Pat. No. 6,575,186 uses a series of sensors on a bonded slit valve door to control the speed of the pneumatic pressure on the door in order to give the door a softer landing during the closing process and avoid seal damage. The three sensors used are for positioning and interaction with the pneumatic closing system.

U.S. Pat. No. 6,291,814 places sensors at either end of a slit valve with emitters and receivers of signals that monitor movement near the door to avoid the door damaging a moving wafer on the seal plate.

U.S. Pat. No. 5,363,872 describes control of a slit valve door based on a pressure differential over a barrier (described as a wall) between an entry chamber and reaction chamber. Each chamber has a sensor, and the pressure differential is analyzed to control operation of the door and the pressure applied by the slit valve door.

The applicant herein has contributed to development of products for monitoring properties in a reaction chamber, having previously developed a camera known as the "Wafer Cam" that allowed camera sensing of the interior of a process chamber, however, such camera was not developed for the operation of monitoring the performance of seals in BSVs or other semiconductor valve assemblies.

Attempts to form objects that conduct electricity using quantum tunneling from acicular particles and/or pressure-sensitive granules for quantum tunneling purposes such as silicone-coated nickel graphite in thin sheets, composite structures useful as transducers having acicular particles and dielectric particles in a liquid silicon polymer matrix that hardens to a solid, and pressure-sensitive conductive fabrics are described in U.S. Pat. Nos. 6,646,540, 6,495,069, 7,301, 435, 8,449,974, 8,765,027 and 9,546,859. Also described by the same inventor, in U.S. Patent Publication No. 2018/0186965, are polymer or elastomer binders such as polyurethane, natural rubber, polyvinyl acetate, polyvinyl chloride, acrylic polymers and silicone including a void-bearing structure such spiky nickel as used in the patents just noted in combination with spherical magnetite conductive material. The final materials are described as able to provide switching (field assisted tunneling) and sensing (conductive tunneling), including as a force sensor, in one device formed in thin films, sheets, filaments, filament coatings, 3D printing feedstock and textiles.

Applicant has previously co-developed a smart seal described in U.S. Patent Publication 2020-0378867-A1, which is based on use of sensors positioned on various locations of a BSV that read data related to micro stress/micro strain, stress relaxation, micro strain measured against the acting vacuum pressure force on the door, temperature as evaluated against the seal cross-sectional geometry and the effect of temperature on micro strain which data are compared to adjusted base line data to determine seal life in real time.

Such attempts to measure properties are highly useful, however, alternatives offering simpler or different effects as indicators of seal life that do not require significant sensor usage to provide needed data would be advantageous in the art, particularly if such sensors did not have a significant impact on the ability of the seal to function and maintain consistent properties over the seal without the use of embedded microsensors or other sensor devices attached to the seal.

There remains a need in the art for improved ways to ensure maximum useful seal life and critical analysis that would assist in choosing the optimal seal and associated maximum seal life for use in semiconductor processing so as to minimize down time and up time, improve maintenance cycles and avoid seal degradation failures, which is simple to monitor and which preferably does not impact the operation of the seal or the consistency of its properties, including maintaining good seal elastomeric, mechanical and chemically resistant properties.

There is further a need in the art also for seals suitable for use in semiconductor manufacturing processes, and/or for use in cleanroom environments, that provide varying and/or responsive electrical properties, while remaining cleanroom friendly such that in the presence of seal degradation over time, harsh metal fillers are not present. Further, there is further a need for such clean seals if able to provide controlled, but varied levels of electrical properties when needed for particular end applications, such as electronic shielding or dissipative end applications, which levels of conductivity are consistent through the seal and can range from low to high levels of conductivity. Such materials would be particularly useful in semiconductor end applications where low levels of particulation and contamination are desired.

Gaskets and seals have been available in the art for use in EMI shielding and/or RFI shielding for various end applications. For example, one may insert a shield between a source of electromagnetic radiation and a desired area of protection. Shielding devices may include shielding gaskets or seals and may come in various configurations to close gaps between an EMI shielding device and the area to be protected. EMI shielding devices may include multiple layers and/or coatings may be applied to various materials by sputtering conductive materials on surfaces of those materials using metals such as nickel or tin. Varying matrix materials have been used including for such parts and components, including metals and polymeric or elastomeric materials such as silicones, fluorosilicones, ethylene-propylene copolymers, epoxy polymers and polyurethanes. Typically, the fillers used in such material are conductive in nature, generally include metal or carbon and are in the form of a particle or fiber filler(s). For example Russian Publication No. RU2724650 C1 discloses use of spherical particles of aluminum, graphite or copper in a silicone, fluorosilicone or ethylene-propylene copolymer.

U.S. Patent Application Publication No. 2012/0177906 A1 teaches an EMI shielding composite material having a volumetric resistivity of not greater than 0.5 ohm-cm that incorporates a metallic filler dispersed in a thermoplastic matrix. Thermoplastics used include polyethylene, polyketone, and thermoplastic fluoropolymers (such as Teflon FEP or polytetrafluoroethylene). The metal filler may be nickel particles or powder, silver-coated tin or a fiber filler such as stainless steel, bronze fiber, aluminum fiber or nickel fiber. The patent describes filler loading up to 70 percent by weight.

Conductive elastomers may also be used for EMI shielding. For example, U.S. Pat. No. 9,814,164 discloses EMI shielding in a sealing system having a conductive elastomer such as a conductive silicone rubber. It further describes use of silicone rubber or fluorosilicone rubber incorporating embedded silver-plated aluminum particles, silver-plated glass beads, silver-plated copper particles, nickel-graphite particles or conductive carbon.

U.S. Pat. No. 8,633,402 describes an EMI gasket that may be formed from an elastomeric polymer such as elastomeric polyethylene, polypropylene, polypropylene-EPDM blends, butadiene, styrene-butadiene, nitrile rubber, chlorosulfonate, neoprene, silicone, urethane and fluorosilicone. The polymer can be filled with conductive particulate filler such as carbon, graphite, copper, nickel, silver and aluminum.

U.S. Pat. No. 7,589,284 describes an EMI shielding material which may include an elastomeric matrix such as silicone, urethane or flexible epoxy; a nonconductive thermoplastic such as polystyrene, polycarbonate/acrylonitrile-butadiene-styrene alloys, polybutylene terephthalate, nylon, polycarbonate, polyacrylonitrile-butadiene-styrene; or a conductive polymer such as polyaniline. The matrix material includes a conductive filler such as nickel-plated carbon powder, carbon powder, silver powder, copper powder, silver/copper powder, silver/aluminum powder, silver-plated glass spheres or nickel powder.

U.S. Pat. No. 9,635,790 describes a mesh sealing element that is a conductive sheet embedded in a matrix polymer gel that may include expanded metal.

U.S. Patent Application Publication No. 2003/0213939 describes thermoplastics or thermosetting elastomers such as polyurethane, styrene-butadiene rubber, EPDM and ethylene-propylene rubber and others that are filled with carbon nanotubes and have a volume resistivity of from 0.01 ohm-cm to $10^8$ ohm-cm. The carbon nanotubes include vapor grown nanotubes that may be multi-wall or single-wall nanotubes. Carbon nanofibers may also be used. Metal fillers may also be used such as carbon black, and metal-coated fibers.

Available shielding materials typically used for semiconductor or cleanroom use employ a nickel-coated graphite particle in a silicone polymer. Despite the variety of EMI and RFI composites available, not all of them are satisfactory when used in clean seals or cleanroom environments, such as semiconductor manufacturing processes. Such environments may require a higher purity sealing material (e.g., a melt-processible fluoropolymer or perfluoropolymer, a fluoroelastomer or a perfluoroelastomer) or other polymer that does not introduce contaminants into the manufacturing process. To achieve desired electrical properties, in many cases the conductive filler loading must be reasonably high to achieve even a nominal EMI and/or RFI shielding effect, and to achieve a high efficiency level, the filler loading must be very high. For certain "clean" or highly chemically resistant matrices, such high filler loadings are not possible when also trying to maintain adequate sealing and physical properties. Further, in a cleanroom environment, many of the state-of-the-art EMI and/or RFI filler materials such as nickel-coated graphite or metallic fillers can be problematic particulates in the environment as the seals degrade over time. It can also be difficult with respect to some of the known EMI and/or RFI shielding materials known in the art to maintain consistent properties throughout the matrix material of the composition. As a result, conductive properties may also be inconsistent within the matrix leaving too much variation in performance and properties.

It would be beneficial to develop EMI and/or RFI shielding compositions for use in making seals that provide good sealing and physical properties, efficient EMI and/or RFI shielding, and preferably also minimize any impact of the conductive material in a clean environment as the underlying matrix deteriorates.

Thus, there further is a need in the art to develop compositions that can provide controlled levels of electrical properties when needed for particular end applications, whether for forming a self-sensing material as noted above with conductive and dissipative properties, or for providing an EMI and/or RFI shielding material, or other conductive end uses. There is further a need in the art for such materials, with levels of conductivity that are generally consistent throughout the seal, gasket or other shielding component, and can range from low to high levels of conductivity. Such materials may be particularly useful in semiconductor end applications where low levels of particulation and contamination are desired.

BRIEF SUMMARY OF THE INVENTION

The invention includes novel compositions and articles formed therefrom which may be employed in a variety of end applications including in higher conductivity end applications for use in EMI shielding and/or RFI shielding or in lower conductive or dissipative end applications in which the articles are able to exhibit conductivity as a thermoplastic or elastomeric quantum tunneling composite (QTC) such that when subjected to application of compressive stress (such as when under a load), the articles exhibit a conductivity that is higher than a conductivity of the article when the compressive stress is released. In one embodiment, they may be insulative and then exhibit conductivity when stress is applied. The measured change in conductivity on the articles (whether initially insulative or conductive) when not subject to compressive stress, and which, when subjected to application of compressive stress, are more conductive, can be used to measure the life of an article such as a seal or gasket over time. The compositions may also be dissipative in nature.

In embodiments in which the compositions may be used for forming articles suitable for use in electromagnetic interference or radiofrequency interference end applications, various embodiments are disclosed herein.

In one such embodiment, a composition for forming an article is disclosed that comprises at least one matrix polymer selected from the group consisting of at least one thermoplastic polymer and/or at least one curable polymer having at least one functional group for crosslinking; and a three-dimensional, branched and/or crosslinked carbon nanostructure additive provided in an amount such that after forming an article the composition, the article is conductive and has a volume resistivity level of about 0.5 ohm-cm or less.

When formed into an article, in an embodiment herein, the article is an electromagnetic interference shielding article and/or a radiofrequency interference shielding article.

The at least one matrix polymer in this embodiment may be at least one curable polymer selected from the group consisting of a curable polymer comprising at least one silicon-containing monomer, a curable polymer comprising at least one monomer containing silicon and fluorine, a curable copolymer comprising at least one acrylonitrile monomer and at least one butadiene monomer, a curable polymer comprising at least one olefinic monomer, a curable polymer comprising at least one fluorinated monomer, a curable polymer comprising at least one perfluorinated monomer, and blends and copolymers thereof. Upon curing, the cured polymer composition comprises one or more elastomers selected from the group consisting of a silicone, a fluorosilicone, a fluoroelastomer, a perfluoropolyether, a perfluoroelastomer, and cured elastomers formed from blends and copolymers thereof In one embodiment, the at least one curable polymer may be selected from the group consisting of a curable fluorinated polymer and a curable perfluorinated polymer. The at least one curable polymer may further be at least one curable perfluorinated polymer or a blend of or a copolymer of at least one curable fluoropolymer and at least one curable perfluoropolymer.

In one embodiment, the matrix polymer is at least one curable polymer having at least one functional group for crosslinking and the composition may further comprise at least one crosslinking additive for reacting with the at least one functional group for crosslinking.

Upon curing the curable polymer composition, the resulting cured material may be used in an electromagnetic interference shielding application or a radio frequency interference shielding application.

The carbon nanostructure additive in one embodiment herein has a carbon content of greater than or equal to (≥) about 97% and a bulk density of about 0.135 g/cm$^3$.

The composition may further include at least one filler different from the at least one carbon nanostructure additive.

In this embodiment, further the composition may include about 0.1 part by weight to about 300 parts by weight of the carbon nanostructure additive per 100 parts by weight of the at least one matrix polymer, more preferably about 0.25 to about 250 parts by weight of the carbon nanostructure additive per 100 parts by weight of the at least one matrix polymer, and most preferably about 0.5 to about 250 parts by weight of the carbon nanostructure additive per 100 parts by weight of the at least one matrix polymer. In a further embodiment, the composition may include about 0.5 to about 80 parts by weight of the carbon nanostructure additive per 100 parts by weight of the at least one matrix polymer.

In this embodiment, when the at least one matrix polymer is selected from the group consisting of at least one curable fluoropolymer, at least one curable perfluoropolyether, and at least one curable perfluoropolymer, the composition may include about 10 to about 80 parts by weight of the carbon nanostructure additive per 100 parts by weight of the at least one matrix polymer, more preferably about 10 parts to about 50 parts by weight of the carbon nanostructure additive per 100 parts by weight of the at least one matrix polymer, and most preferably about 20 parts to about 40 parts by weight of the carbon nanostructure additive per 100 parts by weight of the at least one matrix polymer.

In a further embodiment of the composition, the matrix polymer may be a thermoplastic polymer selected from the group consisting of polyarylene-based polymers, thermoplastic melt-processible fluoropolymers, polyvinyl chloride, polyvinylidene fluoride, polytetrafluoroethylene, chlorinated fluoropolymers, silicon-based polymers, and non-curable fluoropolymers and perfluoropolymers, polyolefins, polyethylene terephthalates, polysiloxanes, polyurethanes, polyaramid, polyamides, polyimides, polyetherimides, polyphenylene sulfides, polyphenylene sulfones, polyether sulfones, polyamideimides, polybenizmidizoles, polycarbonates, polyacrylonitrile-butadiene-styrenes, polybutadiene-styrenes, polyepoxides, and similar materials, as well as blends, copolymers, alloys, and other combinations thereof The composition may further include one or more conductive fillers different from the carbon nanostructure additive that are selected from the group consisting of powders, flakes and fiber fillers comprising one or more of carbon, metal-plated glass, metal-plated particles, wherein the particle comprises a metal or a polymer, nickel-coated graphite, graphene, graphite, carbon black, graphene derivatives, single-wall carbon nanotubes, multi-wall carbon nanotubes, gold, silver, nickel, copper, and combinations or mixtures thereof In such an embodiment, the composition may comprise about 0.25 parts by weight to about 100 parts by weight of the one more conductive fillers different from the carbon nanostructure additive per 100 parts by weight of the at least one matrix polymer.

The invention further includes an article formed from the composition noted above when formed from the matrix polymer. The article may be selected from a gasket, a seal, a cover, and a component part, for use in an electromagnetic interference shielding device or in a radio frequency interference device.

The invention also further includes an electromagnetic interference shielding and/or a radio frequency interference shielding composition, comprising: at least one matrix polymer selected from a thermoplastic and/or a curable polymer having at least one functional group for crosslinking that is selected from at least one curable fluoropolymer, at least one curable perfluoropolyether, at least one perfluoropolymer, at least one curable polymer comprising silicon and fluorine, and copolymers and blends thereof; and about 5 parts by weight to about 300 parts by weight of a carbon nanostructure additive per 100 parts by weight of the at least one matrix polymer, wherein when the composition is cured and formed into an article, it has a volume resistivity level of about 0.5 ohm-cm or less and wherein the carbon nanostructure additive is three-dimensional, branched and crosslinked.

In this embodiment of an electromagnetic interference shielding and/or a radio frequency interference shielding composition, the at least one matrix polymer may be at least one curable perfluoropolymer, and the composition may include about 10 parts by weight to about 80 parts by weight of the carbon nanostructure additive per 100 parts by weight of the at least one curable polymer. Further, in this embodiment, the at least one carbon nanostructure additive may have a carbon content of ≥about 97% and a bulk density of about 0.135 g/cm$^3$.

The invention further includes a composition, comprising: at least one matrix polymer selected from a thermoplastic and/or a curable polymer having at least one functional group for crosslinking, and a three-dimensional, branched and/or crosslinked carbon nanostructure additive provided in an amount such that after forming an article from the composition, the article demonstrates one or more of a dissipative effect and a quantum tunneling composite effect. In this embodiment, the composition may include about 1 part by weight to about 30 parts by weight, and preferably to about 15 parts by weight, of the carbon nanostructure additive per 100 parts by weight of the at least one matrix polymer.

When an article is formed from the composition in this embodiment, the article has a quantum tunneling effect, and the composition preferably comprises at least about 2 parts by weight of the carbon nanostructure to about 30 parts by weight, and preferably to about 15 parts by weight of the additive per 100 parts by weight of the at least one matrix polymer, preferably at least about 3 parts by weight of the carbon nanostructure additive per 100 parts by weight of the at least one matrix polymer, and most preferably at least about 4 parts by weight of the carbon nanostructure additive per 100 parts by weight of the at least one matrix polymer. In one embodiment, the composition comprises about 4 parts by weight to about 20 parts by weight of the carbon nanostructure additive per 100 parts by weight of the at least one matrix polymer, and preferably about 4 to about 15 parts by weight of the carbon nanostructure additive per 100 parts by weight of the at least one matrix polymer.

In this embodiment the matrix polymer may be a thermoplastic polymer selected from the group consisting of polyarylene-based polymers, thermoplastic melt-processible fluoropolymers, polyvinyl chloride, polyvinylidene fluoride, polytetrafluoroethylene, chlorinated fluoropolymers, silicon-based polymers, and non-curable fluoropolymers and perfluoropolymers, polyolefins, polyethylene terephthalates, polysiloxanes, polyurethanes, polyaramid, polyamides, polyimides, polyetherimides, polyphenylene sulfides, polyphenylene sulfones, polyether sulfones, polyamideimides, polybenizmidizoles, polycarbonates, polyacrylonitrile-butadiene-styrenes, polybutadiene-styrenes, polyepoxides, and similar materials, as well as blends, copolymers, alloys, and other combinations thereof.

The composition may further comprise one or more conductive fillers different from the carbon nanostructure additive that are selected from the group consisting of powders, flakes and fiber fillers comprising one or more of carbon, metal-plated glass, metal-plated particles, wherein the particle comprises a metal or a polymer, nickel-coated graphite, graphene, graphite, carbon black, graphene derivatives, single-wall carbon nanotubes, multi-wall carbon nanotubes, gold, silver, nickel, copper, and combinations or mixtures thereof. In such an embodiment, the composition comprises about 0.25 parts by weight to about 100 parts by weight of the one more conductive fillers different from the carbon nanostructure additive per 100 parts by weight of the at least one matrix polymer.

The invention may further include an article formed from the composition according to this embodiment. The article may be a thermoplastic and/or elastomeric quantum tunneling composite, and may be selected from the group consisting of a seal, gasket, or other component in a sealing assembly.

In one embodiment, when the article is not subjected to compressive stress, it is an insulator and when subjected to compressive stress is conductive. In another embodiment, when the article is not subjected to compressive stress, it has a conductivity level that is different than a conductivity level when the article is subjected to compressive stress.

In a further embodiment, the article may be an elastomeric quantum tunneling composite and a self-sensing article, wherein when the article is in electrical communication with a circuit and a voltage is applied, a change in conductivity of the article is measured when the article is in use and subject to compressive stress and the change in conductivity is used to determine and evaluate the performance of the article in real time.

The invention further includes a method of making an article, comprising providing a composition comprising at least one matrix polymer selected from a thermoplastic and/or a curable polymer having at least one functional group for crosslinking and at least one carbon nanostructure additive that is three-dimensional, branched and/or cross-linked, wherein the at least one carbon nanostructure additive is present in an amount of about 0.1 part by weight to about 300 parts by weight per 100 parts by weight of the at least matrix polymer; and forming an article from the composition by either heat-forming the composition or by curing and heat-forming the composition, wherein the article may be used in at least one of an electromagnetic shielding device and a radio frequency shielding device.

In the method the article preferably has a volume resistivity of about 0.5 ohm-cm or less. The at least one matrix polymer may be a curable polymer and the composition may further comprise at least one crosslinking additive for reacting with the at least one functional group for crosslinking. In the method, the article may be selected from a seal, a gasket, a cover or a component part of an electromagnetic interference shielding device and/or a radio frequency interference shielding device.

The invention also includes a method of making an article, comprising providing a composition comprising at least one matrix polymer selected from a thermoplastic and/or a curable polymer having at least one functional group for crosslinking and at least one carbon nanostructure additive that is three-dimensional, branched and crosslinked, wherein the at least one carbon nanostructure additive is present in an amount of about at least about 1 part by weight to about 30 parts by weight per 100 parts by weight of the at least one matrix polymer;

and forming an article from the composition by either heat-forming the composition or by curing and heat-forming the composition, wherein the article exhibits at least one of a dissipative effect or a quantum tunneling effect.

In this method, the article may be a seal, gasket, or other component in a sealing assembly. The matrix polymer may be a curable polymer and the composition may comprise at least one crosslinking additive for reacting with the at least one functional group for crosslinking. The curable polymer may be selected from the group consisting of a curable fluoropolymer, a curable perfluoropolyether, and a curable perfluoropolymer, and blends and copolymers, thereof In one embodiment, the article is an elastomeric quantum tunneling composite. In an embodiment, when the article is not subjected to compressive stress, it is an insulator and when subjected to a compressive stress is conductive. In another embodiment, when the article is conductive when not subjected to compressive stress and has a conductivity level that is different than a conductivity level when the article is subjected to compressive stress, and in one embodiment, the conductivity level of the article when subjected to compressive stress is higher than the conductivity level when the article is not subjected to compressive stress.

In another embodiment, the article is an elastomeric quantum tunneling composite and is a self-sensing article, and when the article is in electrical communication with a circuit and a voltage is applied, a change in conductivity of the article is measured when the article is in use and subject to compressive stress and the change in conductivity is used to determine and evaluate the performance of the article in real time.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
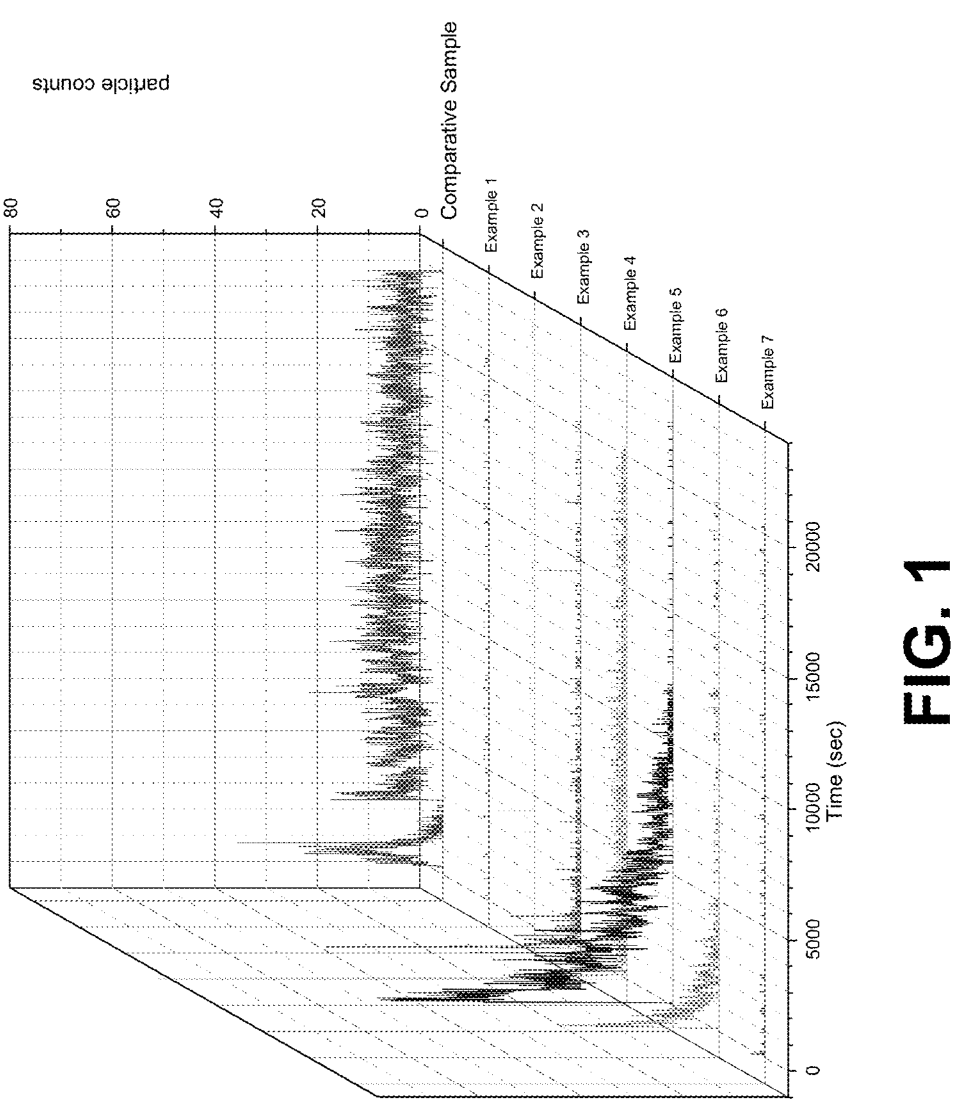
FIG. 1 is a three dimensional graph showing particulation levels over time for Samples tested in Example 1 herein.

As used herein, words like “inner” and “outer,” “upper” and “lower,” “proximal” and “distal,” “top” and “bottom,” and words of similar import are used herein to aid a reader of the disclosure in better comprehension of the invention in view of the drawings herein, and while intending to be helpful to the reader are not meant to be limited in any manner.

Applicants have developed compositions and methods using varying amounts of a particular type of a carbon nanostructure additive to provide articles having varying electrical conductivity such that they may be useful, e.g., as additives in EMI shielding and/or RFI shielding applications, or in amounts that allow for an article to function as a quantum tunneling composite (QTC) or a dissipative conductive polymer or elastomer to be employed in various end applications. When acting as a QTC, in one embodiment, e.g., seals or gaskets can be made to respond to levels of compression that may be translated from conductivity changes in the polymer or elastomer under compressive stress in use so as to allow for evaluation of the seal or gasket life in real time.

Thus, for sealing applications, seals can be made that act as self-sensing seals that can be employed in various end applications where monitoring seal life is key to efficient and cost effective seal performance and maintenance. In semiconductor applications, such seals may be employed in valve assemblies having seals, such as slit valve doors with seals, e.g., BSVs, pendulum valves and other chamber or flow isolation valves, and may also be employed in pharmaceutical clean room applications, downhole and other oil field applications as well as in gas and/or liquid applications in fluid handling chemical applications as seals or other formed articles. As used herein, a "seal" is intended to include a general category of seals and sealing components, including O-rings, gaskets, V-rings, inserts, sealing or shielding layers, and other similar products and is not intended to be limiting unless a specific type of seal is expressly indicated. "Articles" are intended to encompass parts, components, devices, and seals used as products or as part of a product that are formed using the compositions disclosed herein, either alone or in combination with other existing compositions.

With respect to articles such as seals, providing a seal that can respond sensitively by way of its conductivity level in response to an applied compressive stress (such as when subject to a load), the seal may act as a pressure sensor, and the deterioration of the seal can be evaluated by the relationship between compressive stress and the conductivity at a base line, with and without a load applied, when new, so that the seal can be replaced before seal life and performance are impacted through repeat use and/or harsh conditions. While the self-sensing seals, and methods and systems herein for monitoring seal-life herein are particularly useful for seals, such as vacuum seals or KF type seals and in semiconductor manufacturing valve assemblies including BSVs, and other semiconductor seals, they may also be employed in similar valves that are used in fluid handling and in other environments, especially those in which a seal's life is important to operation and in which the seals are in an environment under pressure, strain and environmental or ambient operating conditions wherein the seal is subject to degradation. This is a particularly difficult issue in the semiconductor manufacturing, and with a particular focus on semiconductor seal assemblies, such as BSVs, pendulum valves and isolation valves. It will be understood, based on this disclosure, that the embodiments described herein can be employed for use in other similar valve sealing assemblies and end applications.

Examples of gate and slit valves that include seals are known in the art, and articles made from the compositions and methods herein can be implemented using any of these designs. Examples of commercially acceptable doors of this nature are available from Greene, Tweed & Co. of Kulpsville, Pennsylvania, USA, and are also described, for example, in U.S. Patent Application Publication No. 2012/0100379A1, incorporated by reference in relevant part. Other BSVs and gate valves with bonded or other assemblies with seals that are known or to be developed can be used in the system and method herein.

Such gate and slit valves are generally formed of a metallic door material (metal or metal alloy), with preferred materials including aluminum or stainless steel. The seals in such doors are preferably formed of elastomeric material or material that has elastomeric properties under the operating conditions. Typical materials used are fluoroelastomer, perfluoroelastomers, and silicon-based elastomers, including fluorosilicones. In addition, back-up rings or seals may also be incorporated such as fluoropolymers (like polytetrafluoroethylene) alone or as a backup protection seal for primary seals formed with elastomeric or materials with elastomeric properties.

Such seals may be mechanically affixed, bonded, or molded in place on the door, with a variety of materials and door assemblies available commercially.

The carbon nanostructure additives used herein are preferably those that are formed to have a three-dimensional branched structure and are preferably also formed so as to include within the structures crosslinked carbon nanotubes interlinked with one another to form the three-dimensional branched carbon structure network. Such materials are distinguished from standard single- and multi-walled carbon nanotubes and from carbon allotropes such as plate-like carbons and fluorinated graphites. In preferred embodiments herein, such a three-dimensional, branched carbon nanostructure additive is used that has a carbon content of ≥about 97% and a bulk density of about 0.135 $g/cm^3$, although these properties may be varied depending on the degree of linking and branching that occurs in the manufacturing process. One suitable carbon nanostructure for use herein is available commercially in pellet form through Cabot Corporation as Athlos™ Carbon Nanostructures. Other suitable materials are also available from Cabot, and/or may be made or manufactured as well as purchased commercially. A description of carbon nanostructure materials that are branched and linked and how to make them may be found in U.S. Pat. Nos. 9,107,272, 9,111,658, 9,447,259 and 9,650,501, each of which is incorporated herein in relevant part for its disclosure of methods of making and preparing branched and linked carbon nanostructures.

Because of the dielectric nature of certain of the curable polymer compositions and their resulting elastomer properties when cured, particularly those of fluoroelastomers and/or perfluoroelastomers, the impact of the branched, three-dimensional carbon nanostructure additives may be felt from a strong conductivity level only when the polymer is highly loaded, however, in other applications, such as for preparing pressure-sensing applications, a smaller loading of such carbon nanostructure additive is indicated.

In addition to self-sensing end applications and other uses of QTC compositions as noted above and elsewhere herein, when articles are formed using higher loading of the conductive nanostructure additives herein, such articles may be formed into seals or sealing components, including gaskets, covers and a variety of other component parts having a polymeric or elastomer material therein to provide a bulk resistivity of about 0.5 ohm-cm or less, thereby providing useful EMI and/or RFI shielding effects.

With respect to EMI and/or RFI shielding applications, depending on the curable polymer chosen, the loading may vary. In a variety of polymers, compositions may incorporate from about 0.1 to about 300 parts by weight of the carbon nanostructure per 100 parts by weight of the at least one polymer or curable polymer in the composition, preferably about 0.25 to about 250 parts, more preferably about 0.5 to about 250 parts or about 0.5 to about 80 parts by weight of the carbon nanostructure additive per 100 parts by weight of the at least one polymer or curable polymer in the composition.

Preferably, in polymers such as curable perfluoropolymers and curable fluoropolymers, about 10 to about 50 parts by weight per 100 parts by weight of the polymer or curable polymer may be employed to provide a preferred level of shielding by absorbing or reflecting EMI and/or RFI. For curable perfluoro- and other curable fluoropolymers which may otherwise be generally more difficult to highly load, about 20 to about 40 parts by weight per 100 parts by weight of the curable polymers in the composition may be employed.

In a preferred embodiment, the amount of carbon nanostructure additive used may be varied to attempt to get the best shielding effect, and, if possible also maintaining effective elastomeric and/or mechanical properties for the formed article to be used in the shielding end application(s), all of which will depend on the type of shielding part or component being made. With this material, a desired level of maximum bulk resistivity is about 0.5 ohm-cm for effective shielding, although this may be modified for different end applications. In a perfluoropolymers, for example, use of between about 20 to about 40 parts per 100 parts of the perfluoropolymers in the composition will maintain a balance of required mechanical and elastomeric properties while allowing a bulk resistivity of about 0.5 ohm-cm.

Use of such a carbon nanostructure additive in a curable polymer, once cured may form an elastomeric article according to the invention which may have a variety of shapes and configurations, such as formation into a seal, gasket, a EMI or RFI shielding device or components parts thereof, such as an EMI or RFI filter seal or filter cover. Further, shielding parts formed of other polymeric matrix materials using the carbon nanostructure herein are also within the scope of the disclosure.

When incorporating the at least one carbon nanostructure additive herein to a curable polymer or other polymeric matrix for use in developing a QTC effect or a dissipative conductive polymer or elastomer, lower loadings of the carbon nanostructure additive(s) are indicated in the inventions herein. For example, about 1 part to about 30 parts by weight of the carbon nanostructure additive per 100 parts by weight of the curable polymer(s) or polymeric matrix polymer(s) may be employed to provide a lower level of conductivity than need in a shielding application. Preferably about 1 part to about 15 parts by weight of the carbon nanostructure additive are used per 100 parts by weight of the curable polymer(s) or polymer(s) in the polymer matrix are used.

For some lower conductivity uses, such as antistatic dissipative materials that may be used in automotive, aerospace, oilfield, medical and pharmaceutical or other end uses requiring a conductive material that can dissipate a charge to avoid sparking or other issues yet withstand environments in which particular elastomer matrices are indicated, such lower loading up to about 15 parts by weight of the additive per 100 parts by weight of any base polymers(s) are acceptable for this purpose.

When using the composition for a QTC effect, such as for having a composition that can allow charged particles to jump as in a QTC when the article formed is under compression, low levels of at least about 2 parts, more preferably at least about 3 parts, and most preferably at least about 4 parts to about 30 parts, or to about 15 parts by weight are indicated per 100 parts by weight of the polymer or curable polymer in the composition. In some embodiments, about 4 parts by weight to about 20 parts by weight, and more preferably about 4 to about 15 parts by weight, each per 100 parts by weight of the curable polymer(s) in the composition may be used.

To create the QTC effect, the carbon nanostructures, which are three-dimensional, branched and crosslinked so that the longer tubes are interlinked, create a more densely accessible QTC electron carrying option throughout the article. As the elastomers used may be selected to act as dielectrics when in use and without compressive stress, such as an applied load, the QTC effect in such elastomers may be carried out by applied compressive stress without the need for intervening dielectric additives and/or without the need for acicular carbons as described in prior art QTC composites. The polymer matrix or elastomer matrix in a cured article provides a dielectric environment that is activated with the application of compressive stress on the compressible dielectric elastomer material to yield a level of proportionate conductivity within the matrix that is measurable depending on the degree of compressive stress applied to allow the relationship between compressive stress and content of the carbon nanostructure additive in the elastomer to be measured and quantified in real time when in use, and analyzed so as to determine seal life.

For example, a finished molded article such as an elastomeric seal may be placed in use in electrical communication with a circuit having an applied voltage and known resistance to enable measurement of the bulk resistivity or conductivity of the seal both before application of compressive stress, such as through an applied load or in use by compression of moving parts surrounding the seal in its gland, as well as measuring the same properties over time in use for a given amount of carbon nanostructure additive in the elastomer. The resulting relationship can be used to analyze when the additive and elastomer matrix are beginning to deteriorate and the resistivity and conductivity change. Such measurements can then be used to monitor the performance and life of the seal in use to determine when replacement is needed.

By providing such formed articles from the compositions herein, a seal, gasket or other seal assembly or component part, such as a polymeric or elastomeric component may be made which is “self-sensing” in that its own properties are measured and evaluated to determine seal life and performance in real-time during usage without the need for external sensors, embedding of sensors that impact properties, such as sealing properties, or use of complex sensor placement and relationships around or near a seal on doors such as BSV doors or gates or within reaction chambers or surrounding environments. Further, the carbon nanostructures herein contribute to more consistent conductivity properties throughout the polymer or elastomer matrix of the articles formed.

Further use of compositions herein to form articles that have QTC effects formed from polymers or elastomers can be employed using varying polymers and elastomers for forming self-sensing articles, such as seals, and for use in other known QTC material applications formed from prior art QTC composites such as for use in medical devices, such as blood pressure machine cuffs, in clothing for pressure sensitive controls for audio or phone devices for playing digital sound or video files, for transducers in downhole tools in oil field applications as in U.S. Pat. No. 8,893,547, for sport training dummies having sensors used in boxing or fencing, for evaluating athletic training footwear, for touch sensors and prostheses based on robotic technology as well as in smart seals, and for use in various medical and pharmaceutical applications.

In addition to the carbon nanostructure additives herein, with respect to curable polymer compositions, such compositions include at least one curable polymer that is incorporated in the composition prior to cure. Further such compositions may also include in some preferred embodiments herein crosslinking agents or curative materials, that enable crosslinking of the curable polymers to form elastomers. Crosslinking may also be thermally induced or carried out by radiation using techniques that are known or to be developed in the relevant art, including curing various commercial products using the cure systems that function with their functional crosslinking group, including those that may be indicated by a manufacturer of a commercial curable polymer(s) as described further below.

For polymer-based compositions herein or for elastomer compositions herein formed using curable polymer compositions once cured, such polymer and elastomer compositions can provide polymeric or elastomeric articles, including seals, e.g., O-rings, gaskets, component parts, coatings, layers, and the like that may be used in a variety of end applications including those noted above.

Other additives used may vary depending on whether a non-curable or a curable polymer system selected. For example, varying curable polymers when cured as elastomers have varying mechanical and elastomeric properties and can tolerate or are best used with different additives, processing aids, fillers, pigments and the like. Such additions for polymeric and elastomeric compositions are generally known.

As the carbon nanostructures herein are may be used to impart unique conductivity and resistivity properties to a polymeric or a curable polymeric and/or cured elastomer matrix, whether as a shielding additive, a dissipative additive or a QTC additive, the additives used are preferably those that can either complement or enhance those effects or that do not substantially affect the desired conductive and resistive properties and that also do not overly impact in a negative manner the mechanical or elastomeric properties of the resulting article for its intended end use.

Compositions herein may incorporate elastomeric or non-elastomeric matrix materials. Preferably, in EMI and/or RFI shielding components, the matrix is an elastomer, and in further preferred embodiments, the matrix is a fluoroelastomer, including elastomeric perfluoropolyethers, fluorosilicones, perfluoroelastomers, and blends of these materials and of more than one type of these materials. QTC components may be either elastomeric or non-elastomeric, but in the case of formation of specialty self-sensing seals formed of a QTC composition, it is preferred that the matrix is also elastomeric.

With respect to suitable curable polymers, such materials including those that may crosslink or cure by functional groups to form an elastomeric matrix material. For example, useful elastomers include silicones, fluorosilicones, nitrile rubber, olefinic rubbers (such as ethylene-propylene-diene rubber or ethylene-propylene rubber), fluoroelastomers including perfluoropolyether-based elastomers, perfluoroelastomers, polyurethanes, and copolymers and blends thereof.

Such elastomers are formed from curable polymers, copolymers and blends thereof, including those formed from monomers comprising silicon and/or fluorine, curable polymers having at least one acrylonitrile monomer and at least one butadiene monomer, curable polymers with at least one olefinic monomer, and curable polymers having at least one fluorinated monomer and/or perfluorinated monomer. Such materials may be copolymerized, blended and/or functionalized to form curable polymers. Preferably, at least one of the monomers used to form the at least one curable polymer has one or more functional groups for crosslinking. Crosslinking may be carried out chemically, through use of radiation or heat and/or through addition of one or more crosslinking compounds that upon chemical reaction with a crosslinking site on a functional group on a monomer, can crosslink various monomers to form crosslinked polymers.

"Curing" as used herein is meant to encompass any method of providing an elastomeric structure to a curable polymer by either vulcanization, chemical crosslinking, thermal cross-linking, catalyzed cross-linking, radiation cross-linking and the like. After curing, a curable polymer forms an elastomer. An "elastomer" (also sometimes referred to as a rubber) as used herein is intended to mean a polymeric material that has viscoelastic properties, and that upon application of a stress will deform, but after removal of the stress, will recover a portion of its original form.

As used herein, "compression set" refers to the propensity of an elastomeric material to remain distorted and not return to its original shape after a deforming compressive load has been removed. The compression set value is expressed as a percentage of the original deflection that the material fails to recover. For example, a compression set value of 0% indicates that a material completely returns to its original shape after removal of a deforming compressive load. Conversely, a compression set value of 100% indicates that a material does not recover at all from an applied deforming compressive load. A compression set value of 30% signifies that 70% of the original deflection has been recovered. Higher compression set values generally indicate a potential for seal leakage.

Other elastomeric properties typically measured include elongation at break, tensile modulus, and other physical properties. Thermal behavior of elastomers and their cure system's impact on such properties are also useful for evaluation of an elastomer for various end use applications.

The terms "uncured" or "curable," refer to curable polymers for use in compositions herein, which have not yet been subjected to crosslinking reactions in any substantial degree such that the material is not yet sufficiently cured for the intended end application.

The following provides further information on useful categories of polymers that may be used herein, including those noted above as useful as matrix materials for QTC components or for EMI and/or RFI shielding components.

Silicones for use herein may be formed using a silicon-containing polymer that may be any of a variety of silicone homopolymers and co-polymers that are curable to form a silicone elastomer (also referred to as a silicone rubber). Silicones are generally polymers that incorporate at least silicon, oxygen and hydrogen in their chemical structure. Curable silicon-containing polymers (silicones) which may be used to form silicone elastomers include polymers having a backbone as classified by the Standard Rubber Nomenclature definitions provided by ASTM International in ASTM D1418-17 as VMQ (silicones), PVMQ (phenylsilicones) and FVMQ (fluorosilicones). However, silicones that are not readily classified by ASTM D1418-17 may also be used provided they demonstrate useful manufacturing characteristics. Any such silicones, fluorosilicones or phenylsilicones may be employed in the invention.

Silicones for forming silicone rubber can be cured using a variety of curing systems, including catalyst cure systems, typically using a platinum-based catalyst, a condensation curing system, a peroxide cure system and an oxime cure system.

In platinum catalyst curing, crosslinks are formed using functional silicone polymers such as vinyl-functional silicones and hydride-functional silicones through addition reactions to form the crosslinks. Such reaction leaves no byproducts and so is a preferred pathway for curing in the art.

Condensation systems typically involve a crosslinking material that is activated in some manner. In a common one-part system, functional silicones are employed that when contacted with water at room temperature will undergo hydrolysis and the hydrolyzable groups (hydroxyl or silanol groups) will initiate the curing reaction. The hydrolysis reaction once initiated continues until curing is done, and can take place at room temperature. Crosslinking materials include for condensation systems including functional silanes having active oxygen containing groups such as alkoxy, acetoxy, ester, enoxy or oxime silanes, e.g., methyltrimethoxysilane, methyltriacetoxysilane and similar materials. Such substituted groups and/or functionalized groups can be catalyzed as well if desired using organometallic catalysts such as tetraalkoxytitanates, chelated titanates, tin catalysts (e.g., dibutyl tin dilaurate and acetoxy tin).

In a two-part condensation, the crosslinking material and any catalyst is retained in one container while the curable silicone polymer composition (absent those materials) is retained in a separate container. The curing is initiated upon mixing of the materials in the two containers.

Other silicone cure systems for forming silicone elastomers include peroxide cure systems that can crosslink through a reactive silicone site forming an Si-R-Si link between silicone chains. Suitable commercial silicones for use herein including NuSil® from Nusil Silicone Technology Co., which may be used in QTC or EMI and/or RF shielding applications, and PDMS-Sylgard® from Dow-Corning which may be used in QTC end applications.

Silicone polymers that may be used herein include one or more of polysiloxanes, polyalkylsiloxanes, polydialkylsiloxanes, polyarylsiloxanes, polyaralkylsiloxanes, and blends, alloys or copolymers of these materials with each other or with other curable polymers as described herein. Further, such silicon-containing polymers may have one or more hydrogen or one or silicon-bonded bonded group(s) on the silicon atoms in the main chain substituted with one or more groups, each of which substituted groups may further be functionalized or further substituted or used for crosslinking. Such substituted or functional groups may be branched and/or straight chain groups, including but not limited to hydroxyl, alkyl, alkenyl, alkynyl, aryl, alkoxy, alkenoxy, alkynoxy, aryloxy, arylalkyl, arylalkoxy, arylalkenoxy, vinyl, carboxyl, carbonyl, halogen, heterocyclic, and fluorinated or perfluorinated groups.

Compositions including silicone-containing polymers herein may include curatives, cure initiators, crosslinkers such as a hydrolytic crosslinker, cure catalysts such as an organic peroxide, and other cure system components as noted above and as are known in the art or to be developed.

In addition to the at least one carbon nanostructure additive in the compositions herein, other different additives and/or modifiers that may be used in a curable silicone or fluorosilicone composition include for example, but are not limited to, siloxane additives, ultra-high molecular weight siloxane additives, clarifiers, processing aids, stabilizers, colorants such as pigments and dyes, other fillers, such as non-conductive and/or dielectric carbon black, quartz, pyrogenic silica, standard carbon nanotubes, glass fiber and optional coupling agents, aramid fiber, olefinic fibers, carbon fibers, UV absorbers, UV stabilizers, lubricants, such as waxes, fatty acids and other rheological additives, flame retardants, polyols, amides, fluoropolymers, fluorinated or perfluorinated polymer additives, nanosilica (i.e., nanosilicon dioxide) particles, polysiloxanes, antiblocking aids such as silica and talc, optical brighteners, dispersants, wetting agents, compatibilizers and any other suitable silicon-containing polymer additive and/or modifier known or to be developed for providing desired composition properties, provided such additive(s) are not selected or are not used in amounts that would block, prevent or substantially impact or impede the desired conductivity levels for the intended end application. Other conductive additives may also be used for modified conductivity properties and are described further below in this disclosure.

For QTC applications, for example, it would not be indicated to use a level of a potentially conductive or semi-conductive material that would impact the QTC effect in a self-sensing article. Further, if using the silicone in a shielding end application, it would be desirable to incorporate higher loaded levels of the carbon nanostructure additives herein but not so much that the fillers would overly increase the bulk resistivity. Finally, in these and other end application, it would generally be the case that the quantity of fillers are also controlled to achieve desired compressive stress and resistivity changes for its intended end application.

Preferred additives in silicon-containing polymer compositions or compositions herein are curatives such as peroxide curatives, typically incorporated in about 0.5 to about 5.5 parts per 100 parts of the silicone polymer, or in other systems a platinum catalyst in an amount of about 0.0005 to about 0.0015 parts per 100 parts of silicon-containing polymer. Other preferred additives include colorants and pigments such as white (titanium oxide), yellow (iron oxide or azo), blue (phthalocyanine GS or ultramarine), and/or green (phthalocyanine BS) in amounts that may vary but typically individually up to about 1.0 part per hundred parts silicon-containing polymer or collectively up to about 1.5 parts per 100 parts silicon-containing polymer.

Such additives, other than any specific cure system, when used in a composition having the carbon nanostructure additive, are generally optional additives and may be incorporated in amounts up to a total of about 50% by weight of additives exclusive of the curatives and the carbon nanostructure additive, provided they do not overload the polymer or impede or substantially impact the function of the intended end application.

Depending on the cure system used, the degree of relevant curative may be adjusted for the system. As such cure systems are known in the art, the same systems may be used herein as noted above. Preferred examples of silicones for use within the invention include commercially available silicones such as, those made by Stockwell Elastomerics, in Pennsylvania, and Primasil Silicones Ltd., United Kingdom, which may be used and combined as recommended by their manufacturers.

Nitrile rubbers, such as acrylonitrile-butadiene and its copolymers and variants, and olefinic rubbers (such as EPDM or EPR) are well known and available commercially for use in the invention hereof along with other olefinic rubbers known or to be developed in the art such as Nipol® grades made by Zeon, Keltan® grades made by ArlanXeo Performance Elastomers and Vistalon® made by ExxonMobil. Such compositions and their additives are well known for use in component parts. Such elastomers are better suited for use in the QTC compositions and components herein.

Curable fluoropolymers for use in either QTC or EMI and/or RFI shielding end applications may be any suitable curable fluoropolymer, at varying fluorine contents, including curable perfluoropolymers and curable perfluoropolyethers (PFPE) or PFPE-copolymers, having at least one monomer unit of ($C_n$F2nO), wherein such fluoropolymers preferably include a functional group or reactive monomer along or depending from the curable polymer backbone.

Collectively such fluoropolymers provide materials that are generally useful in harsher environments such as those encountered in oilfield industrial use, petrochemical processing, semiconductor manufacture, gas and food processing, the life sciences, and other clean environments. Use of the carbon nanostructures in clean materials can provide excellent conductivity properties in varying end uses described herein while providing low levels of particulation contamination in the environment, and yet also maintain good processability, even at higher loadings of the carbon nanostructure additives herein.

Regarding curable fluoropolymers which may be used are such materials as are classified by the Standard Rubber Nomenclature definitions provided by ASTM International in ASTM D1418-17. Standard FKM polymers in accordance with such elastomer nomenclature typically have at least two monomers, one of which is fluorinated, and preferably all of which are fluorinated to some degree, with at least one cure site monomer for use in vulcanization. The at least two monomers preferably include vinylidene fluoride and hexafluoropropylene or a similar fluorinated olefin, but may include a variety of other monomers as well that are known or to be developed in the art. The fluoroelastomer composition may also include at least one curing agent that is capable of being subjected to a crosslinking reaction with a functional group in the cure site monomer(s) of the fluoroelastomer. As noted above PFPE monomers and co-monomers may also be used.

With respect to the FKMs herein, such cure site monomer(s) may include one cure site monomer which is curable by a peroxide or other curing system. With respect to peroxide curing systems, such cure site monomer may have a functional group comprising a halogenated material, such as Br or I in the cure site functional group. While at least two of the monomers in an FKM may be hexafluoropropylene (HFP) and vinylidene fluoride (VF2), other typical monomers may be used in addition to these two for forming a variety of fluoropolymers known in the art, and the cure site monomer and cure system may vary. Such systems are known in the art.

The curable fluoropolymers may be radiation crosslinkable, but are preferably crosslinkable (curable) through a cure system wherein a curing agent(s) is/are added that is/are capable of reacting with a functional group(s) in the cure site monomer for form an elastomeric material. Optionally, at least one of a second curing agent, a co-curing agent, and/or a cure accelerator(s) may be employed as well. The compositions herein may have a single curable fluoropolymer or a combination of at least two curable fluoropolymers and/or a curable perfluoropolymer as described further below, in the form of, for example, a polymer blend, grafted composition or alloy, copolymerization, and the like, depending on desired end properties.

The curable fluoropolymer for the compositions herein may optionally include additional such polymers in blend-like compositions or grafted/copolymerized compositions as noted above. Further, the polymer backbones may include a variety of cure site monomer(s) along the chain to provide one or more different functional groups for crosslinking, however, preferably one of such groups, for use in the invention herein, is curable by a peroxide curing system. The compositions may also include curing agents and co-curing agents and/or accelerators to assist in the cross-linking reactions. Additional cure sites and curing systems may be provided to the same or a different cure site monomer, such as cure sites that react with a bisphenyl-based curing system for creating cross-linking, for example, those cure sites that have a nitrogen-containing reactive group, provided that the peroxide curable functional group is preferably also present. Consequently, while the disclosure herein discusses a variety of preferred curatives (also referred to herein as cross-linking agents or curing agents), when additional cure sites known in the art are used, other curatives that are capable of curing such alternative cure sites may also be used in addition to the organic peroxide-based curatives and co-curatives preferred herein. Further description of such cure systems is provided below.

One or more curable fluoropolymer(s) may be present in such compositions. Such polymers are themselves formed by polymerizing or co-polymerizing one or more fluorinated monomers. Various techniques known in the art (direct polymerization, emulsion polymerization and/or free radical initiated polymerization, latex polymerization, etc.) can be used to form such polymers.

The curable fluoropolymer may be formed by polymerizing two or more monomers, preferably one of which is at least partially fluorinated, although fully fluorinated monomers may be used as well. For example, HFP and VF2 are preferably combined with tetrafluoroethylene (TFE) or one or more perfluoroalkyl vinyl ethers (PAVE), or similar monomers along with at least one monomer which is a cure site monomer to permit curing, i.e. at least one fluoropolymeric cure site monomer. A fluoroelastomer composition as described herein may include any suitable standard curable fluoroelastomeric fluoropolymer(s) (FKM) capable of being cured to form a fluoroelastomer, preferably using a cure system and one or more other curing agents as described herein. Examples of suitable curable FKM fluoropolymers include those sold under the trade name Tecnoflon® PL958, Tecnoflon® PFR-LT, Tecnoflon® FOR 801HS, each available from Solvay Solexis, S.p.A., Italy, Dyneon® FE5610 or FC2211, available from 3M, and other similar fluoropolymers which, when employed in the compositions herein, may be curable by a peroxide cure system or a bisphenyl system. Other suppliers of such materials include Daikin Industries, Japan; 3M Corporation, Minnesota; Chemours Company, Delaware, and E.I. DuPont de Nemours & Company, Inc., Delaware, among others. Such FKM polymers are not fully fluorinated on the backbone of the polymer.

In certain embodiments, such as in end applications including clean environments, the at least one first curable fluoropolymer may be a curable perfluoropolymer that will be useful for forming a perfluoroelastomer. A composition herein, whether a curable fluoropolymer composition or perfluoropolymer composition may include only one fluoro- or perfluoropolymer or may include two or more such fluoro- or perfluoropolymers in the composition which when used and/or cured to would form either a single fluoro- or perfluoroelastomer, or when two or more are used, would form a perfluoroelastomeric blended composition or copolymer for curing. Further curable fluoropolymers may be blended with curable perfluoropolymers to make partially fluorinated blended fluoroelastomers.

As used in this application, "perfluoroelastomer" or "cured perfluoroelastomer" unless otherwise indicated, includes any cured elastomeric material or composition that is formed by curing a curable perfluoropolymer(s) such as the preferred curable perfluoropolymers in the curable compositions described herein.

A "curable perfluoropolymer" (sometimes referred to in the art as a "perfluoroelastomer" or more appropriately a "perfluoroelastomer gum") that is suitable to be used to form a cured perfluoroelastomer is a polymer that is substantially completely fluorinated, and which is preferably completely perfluorinated, on its polymeric backbone. It will be understood, based on this disclosure, that some residual hydrogen may be present in some perfluoroelastomers within the crosslinks of those materials due to use of hydrogen as part of a functional crosslinking group. Cured materials, such as perfluoroelastomers are cross-linked polymeric structures.

The curable perfluoropolymers that are used in preferred perfluoroelastomeric compositions herein to form cured perfluoroelastomers upon cure are formed by polymerizing one or more perfluorinated monomers, one of which is preferably a perfluorinated cure site monomer having a cure site, as noted above, i.e., a functional group to permit curing. The functional group may either be or may include a reactive group that may not be perfluorinated. Two or more curable fluoro- or perfluoropolymers, and preferably at least one optional curative (curing agent), may be preferably combined herein in a composition that is then cured forming the resulting crosslinked, cured fluoroelastomeric compositions, and preferably perfluoroelastomeric compositions as described herein.

As used herein, the curable fluorine-containing elastomeric compositions may be curable perfluoropolymer compositions which are blended and combined compositions formed from two or more curable polymers, each of which, if perfluorinated, is formed by polymerizing two or more perfluorinated monomers, including at least one perfluorinated cure site monomer which has at least one functional group (cure site) to permit curing. Such curable perfluoropolymer materials are also referred to generally as FFKMs in accordance with the American Standardized Testing Methods (ASTM) standardized rubber definitions and as described above herein in ASTM Standard D1418-17, incorporated herein by reference in relevant part.

As described herein, the invention includes curable fluorine-containing elastomer compositions, preferably curable perfluoroelastomer compositions, and cured perfluoroelastomer compositions and molded articles formed from such curable fluorine-containing elastomer compositions.

Such perfluoroelastomeric compositions preferably include at least one, and more preferably two or more curable perfluoropolymers, preferably perfluoro-copolymers, at least one of which has a high content of tetrafluoroethylene (TFE). Other suitable co-monomers may include other ethylenically unsaturated fluoromonomers. The degree of TFE used in a perfluoropolymer may be varied for different end properties. Each polymer may also preferably have one or more perfluoroalkylvinyl ethers (PAVEs), which include alkyl or alkoxy groups that may be straight, linear or branched and which may also include ether linkages, wherein preferred PAVEs for use herein include, for example, perfluoromethylvinyl ether (PMVE), perfluoroethylvinyl ether (PEVE), perfluoropropylvinyl ether (PPVE), perfluoromethoxyvinyl ether and other similar compounds, with especially preferred PAVEs being PMVE, PEVE and PPVE, and most preferred being PMVE which provides excellent mechanical strength to resulting articles formed from curing the curable compositions herein. The PAVEs may be used alone or in combinations of the above-noted PAVE types within the curable perfluoropolymers and in the ultimate curable compositions so long as the use is consistent with the invention as described herein.

Preferred perfluoropolymers are co-polymers of TFE, at least one PAVE, and at least one perfluorinated cure site monomer that incorporates a cure site or functional group to permit crosslinking of the curable polymer. The cure site monomers may be of a variety of types with preferred cure sites noted herein. Preferred cure sites preferably are those having a nitrogen-containing group, however, other cure site groups such as carboxyl groups, alkylcarbonyl groups, or halogenated groups having, e.g., iodine or bromine as well as other cure sites known in the art may also be used, particularly since additional curable fluoropolymers or perfluoropolymers beyond a first and/or second curable perfluoropolymer may be provided to the composition.

The disclosure herein also provides for radiation curing or the use of a variety of curatives (also referred to herein as crosslinking agents, curing agents), if other cure sites known in the art are used, other curatives that are capable of curing such alternative cure sites may also be used. For example, peroxide curing systems, such as those based on an organic peroxide, and related peroxide co-curatives may be used with halogenated functional cure site groups. In other embodiments, at least one of the perfluoropolymers includes nitrogen-containing cure sites.

Exemplary cure site monomers are listed below and may be used in the curable fluoropolymer(s) or curable perfluoropolymer(s) described herein for use in the curable compositions, most of which are PAVE-based in structure and have a reactive site. Although the polymers may vary, preferred structures are those having the following structure (A):

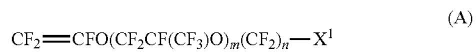

$$CF_2{=}CFO(CF_2CF(CF_3)O)_m(CF_2)_n{-}X^1 \quad (A)$$

wherein m is 0 or an integer from 1 to 5, n is an integer from 1 to 5 and $X^1$ is a nitrogen-containing group, such as nitrile or cyano. However, carboxyl groups, alkoxycarbonyl groups or halogenated end groups may also be used as $X^1$.

Most preferably the cure site monomer in any curable fluoropolymer or curable perfluoropolymer, or in blend of two curable perfluoropolymers in either or both of the first and the second of such curable perfluoropolymers is in accordance with (A) noted above, wherein m is 0 and n is 5. The cure sites or functional groups $X^1$ noted herein, e.g., nitrogen-containing groups, include the reactive sites for crosslinking when reacted with a curative. Compounds according to formula (A) may be used alone or in various, optional, combinations thereof. From a crosslinking perspective, it is preferred that the crosslinking functional group is a nitrogen-containing group, preferably a nitrile group.

Further examples of cure site monomers according to formula (A) include formulas (1) through (17) below:

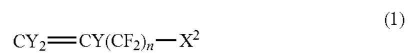

$$CY_2{=}CY(CF_2)_n{-}X^2 \quad (1)$$

wherein Y is H or F, n is an integer from 1 to about 8

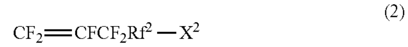

$$CF_2{=}CFCF_2Rf^2{-}X^2 \quad (2)$$

wherein $R_f^2$ is $(—CF_2)_n—$, $—(OCF_2)_n—$ and n is 0 or an integer from 1 to about 5

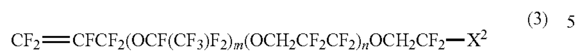

$$CF_2{=}CFCF_2(OCF(CF_3)F_2)_m(OCH_2CF_2CF_2)_nOCH_2CF_2—X^2 \quad (3)$$

wherein m is 0 or an integer from 1 to about 5 and n is 0 or an integer of from 1 to about 5

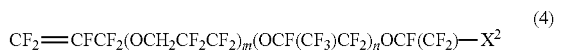

$$CF_2{=}CFCF_2(OCH_2CF_2CF_2)_m(OCF(CF_3)CF_2)_nOCF(CF_2)—X^2 \quad (4)$$

wherein m is 0 or an integer from 1 to about 5, and n is 0 or an integer of from 1 to about 5

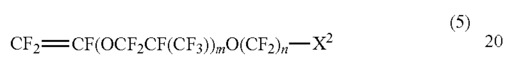

$$CF_2{=}CF(OCF_2CF(CF_3))_mO(CF_2)_n—X^2 \quad (5)$$

wherein m is 0 or an integer from 1 to about 5, and n is an integer of from 1 to about 8

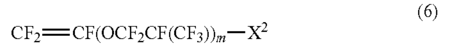

$$CF_2{=}CF(OCF_2CF(CF_3))_m—X^2 \quad (6)$$

wherein m is an integer from 1 to about 5

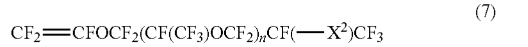

$$CF_2{=}CFOCF_2(CF(CF_3)OCF_2)_nCF(—X^2)CF_3 \quad (7)$$

wherein n is an integer from 1 to about 4

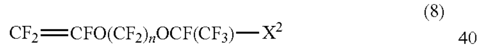

$$CF_2{=}CFO(CF_2)_nOCF(CF_3)—X^2 \quad (8)$$

wherein n is an integer of from 2 to about 5

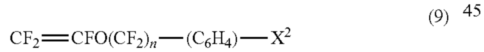

$$CF_2{=}CFO(CF_2)_n—(C_6H_4)—X^2 \quad (9)$$

wherein n is an integer from 1 to about 6

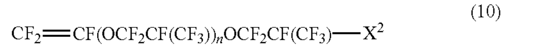

$$CF_2{=}CF(OCF_2CF(CF_3))_nOCF_2CF(CF_3)—X^2 \quad (10)$$

wherein n is an integer from 1 to about 2

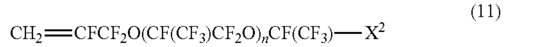

$$CH_2{=}CFCF_2O(CF(CF_3)CF_2O)_nCF(CF_3)—X^2 \quad (11)$$

wherein n is 0 or an integer from 1 to about 5

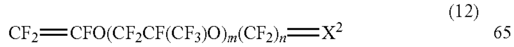

$$CF_2{=}CFO(CF_2CF(CF_3)O)_m(CF_2)_n{=}X^2 \quad (12)$$

wherein m is 0 or an integer from 1 to about 4 and n is an integer of 1 to about 5

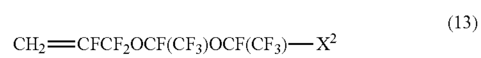

$$CH_2{=}CFCF_2OCF(CF_3)OCF(CF_3)—X^2 \quad (13)$$

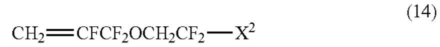

$$CH_2{=}CFCF_2OCH_2CF_2—X^2 \quad (14)$$

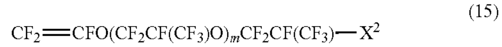

$$CF_2{=}CFO(CF_2CF(CF_3)O)_mCF_2CF(CF_3)—X^2 \quad (15)$$

wherein m is an integer greater than 0

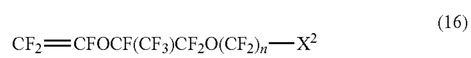

$$CF_2{=}CFOCF(CF_3)CF_2O(CF_2)_n—X^2 \quad (16)$$

wherein n is an integer that is at least 1

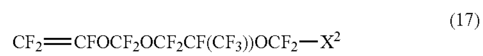

$$CF_2{=}CFOCF_2OCF_2CF(CF_3))OCF_2—X^2 \quad (17)$$

wherein $X^2$ can be a monomer reactive site subunit such as a nitrile (—CN), carboxyl (—COOH), an alkoxycarbonyl group ($—COOR^5$, wherein $R^5$ is an alkyl group of 1 to about 10 carbon atoms which may be fluorinated or perfluorinated), a halogen or alkylated halogen group (I or Br, $CH_2I$ and the like). Perfluorinated compounds when used as cure site monomers generally do not have hydrogen atoms in that portion of the backbone of the cure site monomer that will lie in the polymer backbone chain. Such cure site monomers are used if excellent heat resistance is desired for the perfluoroelastomer resulting from curing the perfluoropolymers as well as for preventing decrease in molecular weight due to chain transfer when synthesizing the perfluoroelastomer by polymerization reaction. Further, compounds having a $CF_2{=}CFO—$ structure are preferred from the viewpoint of providing excellent polymerization reactivity with TFE.

Suitable cure site monomers may include those having nitrogen-containing cure sites such as nitrile or cyano cure sites, for preferred crosslinking reactivity. However, cure sites (having multiple and varied backbones in addition to those noted above) and having carboxyl, alkoxycarbonyls, COOH and other similar cure sites known in the art and to be developed may also be used. The cure site monomers may be used alone or in varied combinations.

Perfluoropolymers that may be used herein include TFE in a molar percentage of TFE in the perfluoropolymer compound of about 50 about 95 mole percent or about 40 to about 80 percent depending on the properties desired. Such a perfluoropolymer may also incorporate a further co-monomer that is preferably also perfluorinated such as a PAVE, many of which are known in the art and may be used herein. A variety of PAVEs may be used in the curable polymer for use in the compositions herein. The cure site monomer in one embodiment may also be a perfluorinated cure site monomer with one more cure site monomers, which may be a cyano group(s). In one embodiment, there may be two such cure site groups, such as one cure site with a primary cyano cure site group and one with a secondary cyano cure site group.

Suitable perfluoropolymers are commercially available from Daikin Industries, Ltd. and are described in U.S. Pat. Nos. 6,518,366 and 6,878,778 and U.S. Published Patent Application No. 2008-0287627, which are each incorporated herein in relevant part with respect to the perfluoropolymers described therein. Additional commercially available perfluoropolymers for use in preferred embodiments herein including at least two cure site monomers are those available from Federal State Unitary Enterprise S.V. Lebedev Institute of Synthetic Rubber of Petersburg, Russia and Lodestar in the United States as described within the scope of International Publication No. WO 00/29479 A1, incorporated herein in relevant part with respect to such perfluoroelastomers, as well as commercial perfluoroelastomers available from Federal State Unitary Enterprise S.V. Lebedev Institute of Synthetic Rubber as PFK-65, PFK-100, PFK-200, PFK-300, and other similar polymers. Suitable perfluoropolymers are also available from Dyneon as PFE 300Z, PFE 133TB or PFE8IT, depending on the desired end properties.

In some embodiments herein, a curable perfluoropolymer may be used having a TFE content ranging from about 40 to about 80 mole percent; a PAVE content ranging from about 20 to about 60, and wherein each of the cure site monomers may be present in an amount of from about 0.1 mole percent to about 10 mole percent total, or each is present in an amount of about 0.1 to about 6 mole percent. In another embodiment a first cure site monomer may be present in an amount of about 0.2 to about 2.0 mole percent and a second cure site monomer present in an amount of about 0.5 to about 5.0 mole percent.

In some embodiments, two or more curable fluoropolymers may be used in a blend in which a polymer such as that noted above may be used with a second curable fluoropolymer or curable perfluoropolymer used herein that may be the same or different than that noted above, and such second curable polymer may have, but need not have, the same content of TFE or PAVE. Preferably a second perfluoropolymer or fluoropolymer may be used and can be one in which a fluoroplastic material is incorporated therein such as a fluoroplastic. The fluoroplastic particles may be provided in a variety of forms and using a variety of techniques. Fluoroplastics such as PTFE, and co-polymers thereof (FEP and PFA type polymers), core-shell or other modified fluoropolymers and in a variety of sizes (microparticles, nanoparticles and the like), each of which alone or in combination may be incorporated into the material by mechanical means or chemical processing and/or polymerization. Techniques which are known or to be developed may be employed, such as those described in U.S. Pat. Nos. 4,713,418 and 7,476,711 (each of which is incorporated herein by reference with respect to such technology) and other techniques as described in U.S. Pat. No. 7,019,083, also incorporated herein by reference with respect to use of fluoroplastic particles. Suitable commercially available polymers are commercially available from 3M Corporation of St. Paul, Minnesota.

Examples of other perfluoropolymers and resulting elastomers formed therefrom using cure site monomers such as those noted above may be also be found in U.S. Pat. Nos. 6,518,366, 6,878,778 and U.S. Published Patent Application No. 2008-0287627 as well as U.S. Pat. No. 7,019,083, each is incorporated herein in relevant part with respect to the perfluoropolymers described therein and their resulting elastomers and methods of forming the same.

Perfluoropolymers for use in the compositions claimed herein may be synthesized using any known or to be developed polymerization technique for forming fluorine-containing elastomers using polymerization, including, for example, emulsion polymerization, latex polymerization, chain-initiated polymerization, batch polymerization and others. Preferably, the polymerization is undertaken so that reactive cure sites are located either on either or both terminal ends of the polymer backbone and/or are depending from the main polymer backbone.

Uncured (curable) perfluoropolymers are commercially available, including perfluoropolymers sold under the name Dyneon™ by 3M Corporation, St. Paul, Minnesota, Daiel-Perfluor® and other similar polymers, available from Daikin Industries, Ltd. of Osaka, Japan. Other preferred materials are available also from Solvay Solexis in Italy, Federal State Unitary Enterprise S.V. Lebedev Institute of Synthetic Rubber of Petersburg, Russia, Asahi Glass, Japan, and W.L. Gore. Other examples of suitable perfluoropolymers and blends thereof may be found, for example in U.S. Pat. Nos. 9,018,309 and 9,365,712, incorporated herein by reference with respect to suitable perfluoropolymers, and blends thereof.

While the uncured perfluoropolymers may be cured through any method, including use of radiation curing, it is preferred to include at least one curative (also referred to herein as crosslinking agents, curing agents and/or curing systems) for use with various curable fluorine-containing elastomer and perfluoroelastomer compositions herein may be selected for use with various cure sites described herein and should be capable of curing (i.e., capable of reacting and crosslinking) or otherwise undergoing a curing reaction with the cure sites or functional groups of the cure site monomer(s) of the various uncured perfluoropolymers in the compositions to form crosslinks, resulting in an elastomeric material in the form of a molded article.

Preferred crosslinking or curing agents are those that form crosslinks that have oxazole, thiazole, imidazole, or triazine rings. Such compounds as well as other curatives including amidoximes, tetraamines and amidrazones may be used for cross-linking in the present invention.

For nitrogen-containing cure sites, preferred curatives are bisphenyl-based curatives and derivatives thereof, including bisaminophenol and its salts and combinations thereof; bisaminothiophenols, parabenzoquinone dioxime (PBQD), as well as salts of various such compounds may be used. Examples of suitable curatives may be found, for example, in U.S. Pat. Nos. 7,521,510 B2, 7,247,749 B2 and 7,514,506 B2, each of which is incorporated herein in relevant part with respect to the listing of various curatives for cyano-group containing perfluoropolymers. In addition, the perfluoropolymers may be cured using radiation-curing technology.

Further preferred curatives for cure sites having a cyano-group cure site are curatives having aromatic amines with at least two crosslinkable groups as in formulas (I) and (II) below, or a combination thereof, which form benzimidazole cross-linking structures upon cure. These curatives are known in the art and discussed in relevant part and with specific examples in U.S. Pat. Nos. 6,878,778 and 6,855,774, which are incorporated herein in their entirety.

(I)

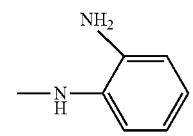

(II)

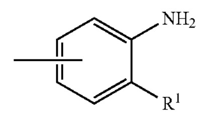

wherein $R^1$ is the same or different in each group according to formula (II) and may be $NH_2$, $NHR^2$, OH, SH or a monovalent organic group or other organic group such as alkyl, alkoxy, aryl, aryloxy, aralkyl and aralkyloxy of from about 1 to about 10 carbon atoms, wherein the non-aryl type groups may be branched or straight chain and substituted or unsubstituted and $R^2$ may be —$NH_2$, —OH, —SH or a monovalent or other organic group such as an aliphatic hydrocarbon group, a phenyl group and a benzyl group, or alkyl, alkoxy, aryl, aryloxy, aralkyl and aralkyloxy groups, wherein each group is from about 1 to about 10 carbon atoms, wherein the non-aryl type groups may be branched or straight chain and substituted or unsubstituted. Preferred monovalent or other organic groups, such as alkyl and alkoxy (or perfluorinated versions thereof) are from 1 to 6 carbon atoms, and preferred aryl type groups are phenyl and benzyl groups. Examples thereof include —$CF_3$, —$C_2F_5$, —$CH_2F$, —$CH_2CF_3$ or —$CH_2C_2F_5$, a phenyl group, a benzyl group; or a phenyl or benzyl group wherein 1 to about 5 of the hydrogen atoms are substituted by fluorine atoms such as —$C_6F_5$, —$CH_2C_6F_5$, wherein groups may be further substituted, including with —$CF_3$ or other lower perfluoroalkyl groups, or, phenyl or benzyl groups in which 1 to 5 hydrogen atoms are substituted by $CF_3$ such as for example $C_6H_{5-n}(CF_3)_n$, —$CH_2C_6H_{5-n}(CF_3)_n$ (wherein n is from 1 to about 5). Hydrogen atoms may be further substituted with phenyl or benzyl groups. However, a phenyl group and $CH_3$ are preferred as providing superior heat resistance, good cross-linking reactivity and relatively easy synthesis.

A structure having formula (I) or (II) incorporated in an organic amine should include at least two such groups of formula (I) or (II) such that at least two cross-linking reactive groups are provided.

Also useful herein are curatives having formulas (III), (IV) and (V) shown below.

(III)

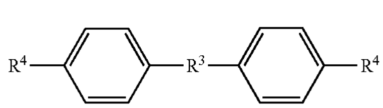

wherein $R^3$ is preferably SO, O or CO or an organic or alkylene type group, such as an alkyl, alkoxy, aryl, aralkyl or aralkoxy group of from one to six carbon atoms or perfluorinated versions of such groups, having from about one to about 10 carbon atoms, and being branched or straight chain, saturated or unsaturated, and branched or straight chain (with respect to the non-aryl type groups) or a single bond. $R^4$ is preferably a reactive side group such as those set forth below:

(IV)

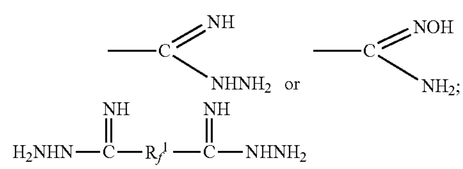

wherein $R_f^1$ is a perfluoroalkyl or perfluoroalkoxy group of from about 1 to about 10 carbon atoms that may be a straight or branched chain group and/or saturated or unsaturated and/or substituted or unsubstituted; and (V)

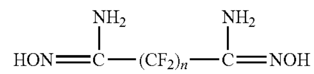

wherein n is an integer of about 1 to about 10.

Single curatives or combinations thereof may be chosen from all of the curatives herein within the scope of the invention depending on the cure sites to be crosslinked. With respect to heat resistance, oxazole-, imidazole-, thiazole- and triazine-ring forming crosslinking agents are preferred and can include the formula compounds listed below and discussed further below with respect to Formulae (I), (II), (III), (IV) and (V), specifically, formula (II) wherein $R^1$ is the same or different and each is —$NH_2$, —$NHR^2$, —OH or —SH, wherein $R^2$ is a monovalent organic group, preferably not hydrogen; formula (III) wherein $R^3$ is —$SO_2$—, —O—, —CO—, and alkylene group of 1 to about 6 carbon atoms, a perfluoroalkylene group of 1 to about 10 carbon atoms or a single bond and $R^4$ is as noted below; formula (IV) wherein $R_f^1$ is a perfluoroalkylene group of 1 to about 10 carbon atoms, and formula (V) wherein n is an integer of 1 to about 10. Of such compounds, those of formula (II) as noted herein are preferred for heat resistance, which is enhanced due to stabilization of the aromatic rings after crosslinking. With respect to $R^1$ in the formula (II), it is preferred also to use —$NHR^2$ as $R^1$, since an N—$R^2$ bond (wherein $R^2$ is a monovalent organic group and not hydrogen) is higher in oxidation resistance than an N—H bond, Compounds having at least two groups as in formula (II) are preferred and having 2 to 3 crosslinkable reactive groups thereon, more preferably having 2 crosslinkable groups.

Exemplary curatives based on the above preferred formulae include at least two functional groups, such as the following structures formula (VI), (VII) or (VIII):

(VI)

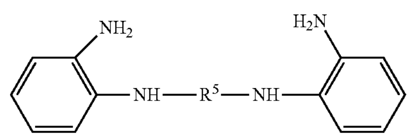

wherein $R^5$ represents a saturated or unsaturated, branched or straight chain, substituted or unsubstituted group such as alkyl, alkoxy, aryl, SO, O, CO, or similar groups which are perfluorinated with respect to the carbon atoms and which is preferably about 1 to about 10 carbon atoms;

(VII)

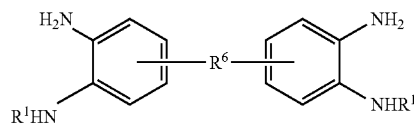

wherein $R^1$ is as defined elsewhere herein and $R^6$ may be O, $SO_2$, CO or an organic group which may be perfluorinated, such as alkyl, alkoxy, aryl, aryloxy, aralkyl and aralkyloxy of from about 1 to about 10 carbon atoms, wherein the non-aryl type groups may be branched or straight chain and substituted or unsubstituted, or a single or alkylene bond.

From the view of easy synthesis, in a further embodiment preferred herein, the most preferred crosslinking agents are compounds having two crosslinkable reactive groups as represented by formula (II) are shown below in formula (VIII).

(VIII)

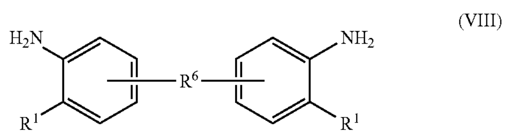

wherein $R^1$ is as above and $R^6$ is —$SO_2$, —O—, —CO—, an alkylene group of 1 to about 6 carbon atoms, a perfluoroalkylene group of 1 to about 10 carbon atoms, a single bond or a group as shown in Formula (IX):

(IX)

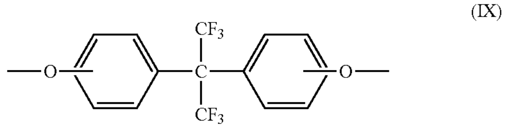

wherein this formula provides an easier synthesis. Preferred examples of alkylene groups of from 1 to about 6 carbon atoms are methylene, ethylene, propylene, butylene, pentylene, hexylene and the like. Examples of perfluoroalkylene groups of 1 to about 10 carbon atoms are

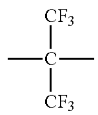

and the like. These compounds are known as examples of bisaminophenyl compounds. Preferred compounds according to this structure include those of formula (X):

(X)

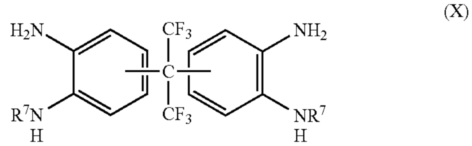

wherein $R^7$ is the same or different in each instance and each $R^7$ is hydrogen, an alkyl group of 1 to about 10 carbon atoms; a partially fluorinated or perfluorinated alkyl group of 1 to 10 carbon atoms; a phenyl group; a benzyl group; or a phenyl or benzyl group in which 1 to about 5 hydrogen atoms have been replaced by fluorine or a lower alkyl or perfluoroalkyl group such as $CF_3$.

Non-limited examples of curatives include 2,2-bis(2,4-diaminophenylhexafluoropropane, 2,2-bis[3-amino-4-(N-methylamino)phenyl] hexafluoropropane, 2,2-bis[3-amino-4-(N-ethylamino)phenyl] hexafluoropropane, 2,2-bis[3-amino-4-(N-propylamino)phenyl] hexafluoropropane, 2,2-bis[3-amino-4-(N-phenylamino)phenyl]hexafluoropropane, 2,2-bis[3-amino-4-(N-perfluorophenylamino)phenyl] hexafluoropropane, 2,2-bis[3-amino-4(N-benzylamino)phenyl]hexafluoropropane, and similar compounds. Of these, for preferred excellent heat resistance properties, 2,2-bis[3-amino-4(N-methylamino)phenyl]hexafluoropropane, 2,2-bis[3-amino-4-(N-ethylamino)phenyl]hexafluoropropane, 2,2-bis[3-amino-4-(N-propylamino)phenyl]hexafluoropropane and 2,2-bis[3-amino-4-(N-phenylamino)phenyl] hexafluoropropane are preferred. Also preferred for heat resistant properties is tetra-amines such as 4,4'-[2,2,2-Trifluoro-1-(trifluoromethyl) ethylidene]bis[N1-phenyl-1,2-benzenediamine] or 2,2-bis[3-amino-4-(N-phenylamino-phenyl)]hexafluoropropane is preferred.

Other suitable curatives include oxazole-, imidazole-, thiazole-, and triazine-ring forming curatives, amidoxime and amidrazone crosslinking agents, and particularly bisaminophenol, bisaminophenol AF, and combinations thereof; bisaminothiophenols; bisamidines; bisamidoximes; bisamidrazones; monoamidines; monoamidoximes and monoamidrazones as known in the art or to be developed, examples of which are set forth, for example in U.S. Pat. Nos. 7,247,749 and 7,521,510, incorporated herein in relevant part by reference, including the curatives and co-curatives and accelerators therein. The bisamidoxime, bisamidrazone, bisaminophenol, bisaminothiophenol or bis-diaminophenyl curatives are most preferred herein for reacting with nitrile or cyano groups, carboxyl groups, and/or alkoxycarbonyl groups in the perfluoropolymer to form a perfluoroelastomer preferred in some embodiments herein having an oxazole ring, a thiazole ring, an imidazole ring, or a triazine ring as crosslinks in the resulting cured articles formed from the compositions herein.

In one embodiment herein, a compound can be used including at least two chemical groups with cross-linking reactive groups as in Formula (I) or (II) in order to increase heat resistance and to stabilize an aromatic ring system. For groups such as in (I) or (II), having two to three such groups, it is preferred to have at least two in each group (I) or (II), as having a lesser number of groups may not provide adequate cross-linking. Such combinations are known and are described in applicant's U.S. Pat. Nos. 9,018,309 B2 and 9,365,712 B2, incorporated herein in relevant part.

Such compositions preferably are blends having the first curable perfluoropolymer and the second curable perfluoropolymer in a range of ratios of about 95:5 to about 5:95, preferably about 80:20 to about 20:80, and more preferably about 40:60 to about 60:40, or about 50:50. Each of the at least one cure site monomers in each of the curable perfluoropolymers is preferably present in an amount of about 0.1 to about 10 mole percent respectively and individually in each of the curable perfluoropolymers used in any blended composition.

When at least one curative is used, it may be present in varying amounts suitable to cure the curable perfluoropolymers' cure site monomers in the composition, for example, in total amounts of about 0.2 parts by weight to about 10 parts by weight per 100 parts by weight of the at least one curable perfluoropolymers in the composition, and each may be present in an amount of about 0.1 to about 6 parts by weight per 100 parts by weight of the perfluoropolymers in the composition, or preferably about 0.1 to about 2 parts by weight per 100 parts by weight of the perfluoropolymers in the composition. In one embodiment, at least two curatives are used in the first perfluoropolymer in an amount of about 0.5 to about 4 parts by weight per 100 parts by weight of the perfluoropolymers for a first curative and about 0.3 to about 2 parts by weight per 100 parts by weight of the perfluoropolymers for at least one second curative.

The at one cure site in the at least one cure site monomer in either or both of the curable perfluoropolymers in a blend may be a nitrogen-containing cure site. The at least one cure site in the at least one cure site monomer in the first curable perfluoropolymer may be selected from the group consisting of cyano, carboxyl, carbonyl, alkoxycarbonyl, and combinations thereof, and most preferably is a cyano group.

The at least one curative may preferably one of the following suitable curatives: fluorinated imidoylamidines; bisaminophenols; bisamidines; bisamidoximes; bisamidrazones; monoamidines; monoamidoximes; monoamidrazones; biasminothiophenols; bisdiaminophenyls; tetra-amines and aromatic amines having at least two crosslinkable groups represented by the formula (II):

(II)

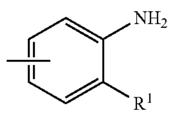

wherein $R^1$ are the same or different and each is —$NH_2$, —$NHR^2$, —OH or —SH; $R^2$ is a monovalent organic group; compounds represented by the formula (III):

(III)

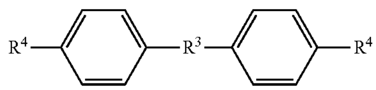

wherein $R^3$ is —$SO_2$—, —O—, —CO—, an alkylene group having 1 to 6 carbon atoms, a perfluoroalkylene group having 1 to 10 carbon atoms or a single bond and $R^4$ is

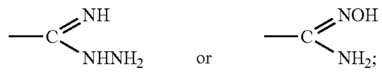

compounds represented by Formula (IV):

(IV)

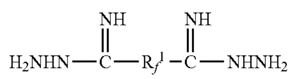

wherein $R_f^1$ is a perfluoroalkylene group having 1 to 10 carbon atoms; compounds represented by the formula (V):

(V)

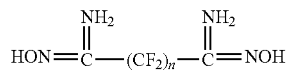

in which n is an integer of 1 to 10; and combinations thereof, wherein the at least one curative is capable of reacting with the least one cure site in the at least one first perfluoropolymer and the at least one cure site in the second perfluoropolymer to crosslink the at least one perfluoropolymer and the at least one second perfluoropolymer in the composition.

The at least one curative is even more preferably an aromatic amine having at least two crosslinkable groups represented by the formula (II), wherein $R^1$ is —$NHR^2$; fluorinated imidoylamidines; bisaminophenols; and combinations thereof.

In one embodiment, the curable fluorine-containing elastomer composition includes the at least one curative as a compound which is preferably a tetra-amine compound within the scope of those compounds noted above. Such compounds may be used alone or in combination. Most preferred compounds for use herein as curatives are those in accordance with formula (II) wherein $R^1$ is —$NHR^2$ and $R^2$ is an aryl group. Such compound is also known as is 4,4'[2,2,2-Trifluoro-1-(trifluoromethyl) ethylidene]bis[N1-phenyl-1,2-benzenediamine] ("Nph-AF") (Also known as "V6").

(XI)

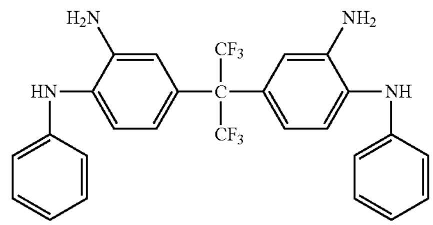

In another embodiment herein, a curative which may be used includes perfluoroimidoylamidines such as those found in U.S. Pat. No. 8,362,167, incorporated by reference in relevant part herein, with respect to the following compound and similar compounds. One preferred compound, also described as DPIA-65 is shown hereinbelow.

(XII)

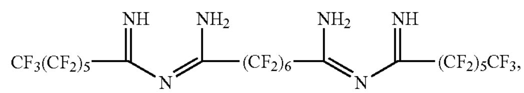

Other preferred compounds are bisaminophenol and its salts, and combinations of that material with other curatives.

In one embodiment, the composition may be a perfluoroelastomer composition and the at least one curative may include use of Nph-AF (or V6):

(XI)

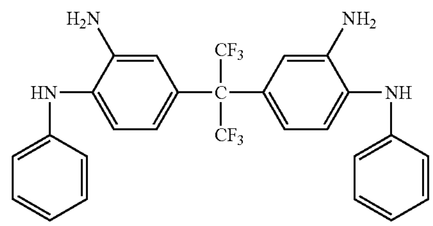

This compound may be used alone or with another curative(s), such as in combination with bisaminophenol or bisaminophenol AF and/or in combination with or as an alternative thereto, wherein the at least one curative may further comprise the DPIA-65:

(XII)

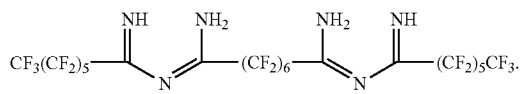

In other preferred embodiments herein, the compound of formula (XII) is used alone or in combination with (VIII)

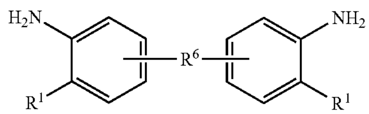

wherein each $R^1$ is independently —$NH_2$, —$NHR^2$, —OH or —SH; $R^2$ is a monovalent organic group; and wherein $R^6$ is —$SO_2$, —O—, —CO—, an alkylene group of 1 to about 6 carbon atoms, a perfluoroalkylene group of 1 to about 10 carbon atoms, a single bond or a group as shown in Formula (IX):

(IX)

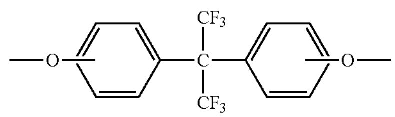

The second curative in such a combination is preferably a compound according to formula (X):

(X)

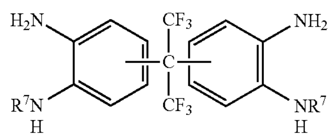

wherein $R^7$ is independently selected from hydrogen, an alkyl group of 1 to about 10 carbon atoms; a partially fluorinated or perfluorinated alkyl group of 1 to 10 carbon atoms; a phenyl group; a benzyl group; or a fluorinated or partially fluorinated phenyl group; a fluorinated or partially fluorinated benzyl group; or a phenyl or an alkyl group having a functional group or groups that is a lower alkyl or perfluoroalkyl group. The second curative in the combination is preferably a bisaminophenol and its salts or combinations thereof.

In another embodiment, preferred ratios of the type of curatives represented by formula XII to a bisaminophenol type curative or related compound may preferably be about 0.5:1 to about 35:1, preferably about 1:1 to about 32:1 and most preferably about 2:1 to 15:1.

One curable perfluoroelastomer composition for use with the carbon nanostructures herein noted above includes a curable perfluoropolymer comprising tetrafluoroethylene, a first perfluoroalkylvinyl ether and at least one first cure site monomer having at least one cure site, or in a further embodiment, having at least two cure site monomers, wherein the tetrafluoroethylene and a second perfluoroalkylvinyl ether are present in the curable perfluoropolymer in varied amounts. At least one second cure site monomer having at least one cure site may also be used. A further, additional curable perfluoropolymer may be used as well.

The carbon nanostructure additives used herein may be incorporated into the polymer blend before or after blending the polymers and before or after incorporating any other fillers or additives, however, it is preferred that when using blended polymers, that the polymers are blended prior to introducing additives or fillers and/or the carbon nanostructure additives herein. It is also preferred that any curative(s) are introduced after other fillers and additives, including the carbon nanostructure additive, and before curing to avoid premature initiation of curing.

In addition to the curatives noted herein for use with fluorine-containing curable perfluoropolymers having nitrile groups and the like, it is within the scope of the invention to cure the nitrile groups using curatives known in the art for the at least one curable perfluoropolymers and/or for other perfluoropolymers added to the compositions herein. Examples of other curatives known in the art that are preferred include those that are able to form triazine rings. Peroxide curatives and co-curatives as are well known in the art may also be used if halogenated cure sites are employed. Other suitable curatives may include those listed above.

Additives, other that curatives and the carbon nanostructure additives herein, that may be incorporated in curable fluoropolymer and perfluoropolymer compositions, blends and copolymers, although unnecessary, include one or more cure accelerators, co-curatives, co-agents, processing aids, plasticizers, fillers such as silica (unless it has an impact on the conductivity), fluoropolymers as noted above such as TFE, fluorinated-copolymers, core-shell modified fluoropolymers and the like in micropowder, pellet, fiber and nanopowder forms, fluorographite (in amounts that would not impact the end effects desired or the electrical conductivity effects), barium sulfate, non-conductive, low conductive or dielectric carbon black or carbon fluoride, clay, talc, metallic fillers (such as titanium oxide, aluminum oxide, yttrium oxide, silicon oxide, zirconium oxide) particularly in EMI/RFI applications that are not in environments where metallic materials are problematic, metal carbides (silicon carbide, aluminum carbide), metallic nitrides (silicon nitride, aluminum nitride), other inorganic fillers (aluminum fluoride, carbon fluoride), colorants, organic dyes and/or pigments, such as azo, isoindolenone, quinacridone, diketopyrrolopyrrole, anthraquinone, and the like, imide fillers (such as polyimide, polyamide-imide and polyetherimide), ketone plastics (such as polyarylene ketones like PEEK, PEK and PEKK), polyarylates, polysulfones, polyethersulfones, polyphenylene sulfides, polyoxybenzoate, and the like may be used in amounts known in the art and/or which may be varied for different properties. All of the fillers herein may be used alone or in combinations of two or more such fillers and additives.

Preferably any additives which are within the at least one optional curative(s) capable of curing the cure site(s) on the one or more cure site monomers, including any cure accelerators, co-curatives, co-agents and the like are added after other fillers, additives and/or the carbon nanostructure additive, e.g., pellets, are incorporated into the fluoro- or perfluoropolymer(s) and form their network within the curable polymers during mixing or blending.

The compositions for use with end applications and formed articles, particularly for EMI and RFI shielding, may be highly filled if desired with the carbon nanostructure additives. Optional fillers such as those noted above may be used in a total amount of up to about 100 or even up to 300 parts per 100 parts of the at least one curable polymer in the composition, and may be more or less as described further hereinbelow.

After the curable polymers are combined with the carbon nanostructure additive and/or any other optional additive(s), including any optional curative(s) and related additives, if any, the curable polymer(s) in the fluoroelastomeric or perfluoroelastomeric compositions are cured to form a cured fluoroelastomeric or perfluoroelastomeric articles as described herein.

The curable compositions are preferably cured at temperatures and for times which would be traditionally used to form the desired cross-links depending on the curing method or curing system, cure sites and/or curatives chosen. The temperatures should be sufficient to allow the curing reaction to proceed until the curable fluoro- or perfluoropolymer(s) in the composition are substantially cured, preferably at least 90% cured or higher. Preferred curing temperatures and times for preferred curable fluoropolymer and/or perfluoropolymer compositions will depend upon the polymer but may be, e.g., about 150° C. to about 250° C., for about 5 to about 40 minutes. Following curing, optional postcuring steps may be used. Examples of suitable postcure temperatures and times for preferred perfluoropolymers noted herein, e.g., are about 200° C. to about 360° C. for about 5 to about 48 hours.

While curing, the curable compositions described herein may be formed into a molded article while simultaneously curing using heat and pressure applied to a mold. Preferably, combined curable fluoro- and perfluoropolymer(s) are formed into a preform, such as an extruded rope or other shape useful for including the preform in a mold having a recess shaped to receive the preform and for forming a molded article while curing. Optional postcuring can also be carried out preferably under air or an inert gas, e.g., nitrogen.

Additional curatives and cure accelerators, either to work with or accelerate the cure of the fluoro- or perfluoropolymer(s) or to cure and/or accelerate cure of any additional optional curable polymers may also be included herein. Non-curable fluoropolymers or perfluoropolymers include those which lack a reactive cure site and are formed from one or more ethylenically unsaturated monomers (such as TFE, HFP and PAVE). Additional curable perfluoropolymers may be any of the curable perfluoropolymers noted herein as well as those having cure sites suitable for crosslinking with organic peroxide cure systems as are known in the art, bisaminophenyl-based cures and the like. Such polymers may be added to develop alternative blends and to modify the properties of the compositions noted herein.

In addition to use of the carbon nanostructures in an elastomer matrix as noted above, it is possible to use various polymeric matrices that are useful for forming parts and components (including hard seals such as certain gaskets) that can be used in either of the QTC or the EFI and/or RFI shielding end applications. However, it is more preferred to incorporate the carbon nanostructure additives herein within an elastomeric matrix as noted above. Polymers for use as primary matrix components, such as in the QTC end application, e.g., for forming a self-sensing compressible gasket or medical part or component, may be a variety of homopolymers, copolymers, or blends or alloys of such polymers. Preferred polymers are those known to be suitable for use with conductive fillers or additives, and can include thermoplastics.

Examples of suitable matrix polymers include polyarylene-based polymers (polyether ketones, polyetherether ketones, polyetherketone ketones, and the like), thermoplastic melt-processible fluoropolymers such as hexafluoropropylene-perfluoroalkylvinyl ether copolymers and fluorinated ethylene-propylene polymers, polyvinyl chloride, polyvinylidene fluoride, polytetrafluoroethylene, chlorinated fluoropolymers, silicon-based polymers, and non-curable fluoropolymers and perfluoropolymers, polyolefins such as polyethylene, polypropylene (including high-density and low-density versions of such polyolefins), polyethylene terephthalates, polysiloxanes, polyurethanes, polyaramid, polyamides, polyimides, polyetherimides, polyphenylene sulfides, polyphenylene sulfones, polyether sulfones, polyamideimides, polybenizmidizoles, polycarbonates, polyacrylonitrile-butadiene-styrenes, polybutadiene-styrenes, polyepoxides, and similar materials, as well as blends, copolymers, alloys, and other combinations thereof.

In the compositions and various end components and applications herein, wherein the carbon nanostructure additives are incorporated into polymers or curable polymers described above for forming articles, the carbon nanostructures may be combined with other known QTC or EMI and/or RFI shielding additives or other suitable additives for use in the required end application or with the chosen matrix polymer as noted above. In certain embodiments herein such three-dimensional, branched and/or crosslinked carbon nanostructure additives can be combined with other standard conductive fillers such as powder, flakes or fiber fillers of carbon, metal-plated glass, metal-plated particles of other metals (such as nickel, aluminum or copper) or of polymer fillers, nickel-coated graphite, graphene, graphite, carbon black, graphene derivatives, standard single-wall or multi-wall carbon nanotubes, gold, silver, nickel, copper, and combinations or mixtures thereof. Such additional conductive additives may be present in amounts of about 0.25 parts by weight to about 100 parts by weight per 100 parts by weight of the matrix polymer(s), provided that any conductive filler is not present in an amount that would unnecessarily impede or otherwise materially affect the beneficial properties of the carbon nanostructures in the polymers and curable polymers herein for their intended end applications.

The invention will now be described with respect to the following, non-limiting examples.

EXAMPLE 1

In this Example, formulations were made for use in EMF or RFI shielding end applications. The compositions made according to the invention were compared with an industry standard for these particular end applications which incorporates a fluorosilicone matrix and a nickel-coated graphite filler. Such materials are inexpensive as a base polymer and can be highly loaded, such that they have come to be used as a standard product for this end application. This material is available as a commercial product, Stockwell 80, from Stockwell Elastomerics Inc. This material was tested along with varying samples that were formed into O-rings for testing in 214 sample size. Some were bonded to an aluminum plate. The samples were installed in a small valve that was modified for heating. The valve was cycled at a rate of 1 cycle/2 seconds. Test samples were loaded into the valve and heat applied. Clean, filtered air was drawn through the valve during cycling and fed into a particle counter. Particle counts were collected during the entire test.

A Comparative Sample of Stockwell 80 fluorosilicone (FMVQ) with a nickel-graphite filler was used in this Example along with Samples 1-7 which were prepared using fluoroelastomer (FKM) and perfluoroelastomer (FFKM) compositions. In the perfluoroelastomer composition, PFK- 300 polymer from Lodestar was included in a composition having 40 parts per 100 parts of curable polymer of Cabot® CNS Pellets which are a three-dimensional, branched carbon nanostructures having interlinked tubes. The composition also included a bisaminophenol (BOAP) curative in 1.6 parts per 100 parts curable polymer and 3 parts of Fomblin® oil for processability. The fluoroelastomer composition used included 100 parts of Tecnoflon™ FOR 801HS as a curable polymer, with 50 parts of the same Cabot carbon nanostructure additive and 9 parts by weight of Electromag™ 170, each based on 100 parts by weight of the curable polymer. The compositions were tested according to the Table 1 and the particulation results are shown in FIG. 1.

TABLE 1

| Sample No. | Elastomer | Type | Temperature |
|---|---|---|---|
| Comparative Sample | FVMQ | gasket | 200° C. |
| 1 | FFKM | bonded seal | 250° C. |
| 2 | FFKM | bonded seal | 250° C. |
| 3 | FFKM | bonded seal | 250° C. |
| 4 | FKM | bonded seal | 250° C. |
| 5 | FFKM | seal | 250° C. |
| 6 | FFKM | seal | 200° C. |
| 7 | FFKM | seal | 200° C. |

The Comparative Sample after percolation yielded good resistivity as expected for its commercial end use, with an ongoing release of particles at counts as shown over time. In each of the Test Samples, an initial surface or percolation release occurs and then the particulation quickly reduces to significantly low levels over time. In comparison with the commercial standard, the particulation levels of the inventive samples in use are significantly lower.

Further compounds were formed using the fluoroelastomer FKM as noted above with varied amounts of the Cabot carbon nanostructure additive and varying amounts of the Fomblin® oil as shown below using the initial composition in Table 2, Sample 4 as the control in this test to demonstrate the volume resistivity in ohm-cm under 20 lbs. load. As can be seen Samples according to the invention were not only able to produce substantially lower particulation in comparison to a commercially accepted state of the art sample but also provided excellent conductivity and showed volume resistivity levels below 0.5 ohm-cm. This data is shown below in Table 2.

TABLE 2

| | Sample Nos. | | | | | |
|---|---|---|---|---|---|---|
| Components | 8 | 9 | 10 | 11 | 12 | 4 |
| FOR 801 HS | 100 | 100 | 100 | 100 | 100 | 100 |
| CNS Pellets | 70 | 70 | 40 | 40 | 55 | 50 |
| Fomblin M60 | 0 | 6 | 0 | 6 | 3 | 0 |
| Elastomag 170 | 9 | 9 | 9 | 9 | 9 | 9 |
| Volume Resistivity (ohm-cm) | 0.33 | 0.46 | 1.72 | 1.79 | 0.82 | 0.88 |

EXAMPLE 2

In this Example, compositions according to the invention were prepared that exhibited properties consistent for use in QTC elastomer composites. Compositions were formed using Tecnoflon® VPL X75545 fluoroelastomer, a peroxide curable FKM. The same Cabot carbon nanostructures in pellet form used in Example 1, were incorporated in varying levels by weight based on 100 parts by weight of the Tecnoflon® base polymer. A peroxide cure system including Varox® DBPH-50 peroxide curative and triallylisocyanurate (TAIC) DLC co-curative were also included as curative additives. Additional fillers included an Austin Black 325 (a non-conductive carbon filler useful for processability due to its platy structure) and a low level conductive thermal carbon black N-990 from Cancarb available as Thermax®. Due to the size of the filler, the Thermax® additive did not impede the networked and interlinked structure of the carbon nanostructures.

Properties of the Samples 13-21 were tested and the physical properties and formulations are shown below in Table 3.

TABLE 3

| Components (phr) | 13 | 14 | 3.5 | 16 | 17 | 18 | 19 | 20 | 21 |
|---|---|---|---|---|---|---|---|---|---|
| Tecnoflon VPL X 75545 (FKM) | 100 | 100 | 100 | 100 | 100 | 100 | 100 | 100 | 100 |
| N-990 Black | 5 | 5 | 5 | 5 | 5 | 5 | 5 | 5 | 5 |
| Austin Black 325 | 3 | 3 | 3 | 3 | 3 | 3 | 3 | 3 | 3 |
| Cabot carbon nanostructure | 4.8 | 6 | 7.2 | 8.4 | 9.6 | 4.8 | 4 | 4.25 | 4.5 |
| TAIC DLC | 5 | 5 | 5 | 5 | 5 | 5 | 5 | 5 | 5 |
| Varox DBPH-50 | 2 | 2 | 2 | 2 | 2 | 2 | 2 | 2 | 2 |

| | Sample Number | | | | | | | | |
|---|---|---|---|---|---|---|---|---|---|
| Physical Properties | 12 | 13 | 14 | 15 | 16 | 17 | 18 | 19 | 20 |
| Tensile strength, psi | 2149 | 2602 | 2859 | 2925 | 2962 | 1900 | 1847 | 1863 | 1935 |
| Elongation, % | 136 | 110 | 80 | 77 | 63 | 148 | 158 | 143 | 154 |
| Modulus @100%, psi | 1847 | 2538 | NA | NA | NA | 1556 | 1460 | 1522 | 1535 |
| Modulus @50%, psi | 1104 | 1662 | 2168 | 2378 | 2608 | 889 | 843 | 882 | 844 |
| Specific Gravity | 1.8 | 1.8 | 1.8 | 1.8 | 1.8 | 1.8 | 1.8 | 1.8 | 1.8 |
| Hardness, type A, pts | 75.8 | 79.4 | 83.2 | 85.2 | 85.4 | 76.3 | 76.0 | 74.6 | 75.9 |
| Hardness, type M, pts | 79.1 | 84.0 | 86.6 | 88.1 | 90.5 | 81.2 | 78.8 | 81.8 | 81.5 |
| Compression Set % | 12 | 13 | 14 | 15 | 16 | 17 | 18 | 19 | 20 |
| 70 hr @) 392° F./200° C. 25% Deflection (avg.) | 36.76 | 41.18 | 45.59 | 48.53 | 51.43 | 40.00 | 38.57 | 38.57 | 44.29 |

Testing of samples having 0-4.8 parts by weight of the carbon nanostructure additive per 100 parts by weight of curable polymer demonstrated in initial screening that a level of at least about 4.8 of the carbon nanostructure additive in the formulations provided an amount adequate for measuring volume resistivity. Further testing was carried out using the Samples 12-20 in the form of O-rings and buttons with carbon nanostructure additive present in amounts of from 4.8 to 9.6 parts by weight per 100 parts by weight of the curable polymer. Volume resistivity was measured using a through plane and a 4-point probe test method using a Ketihley 2410.

Figure 2:
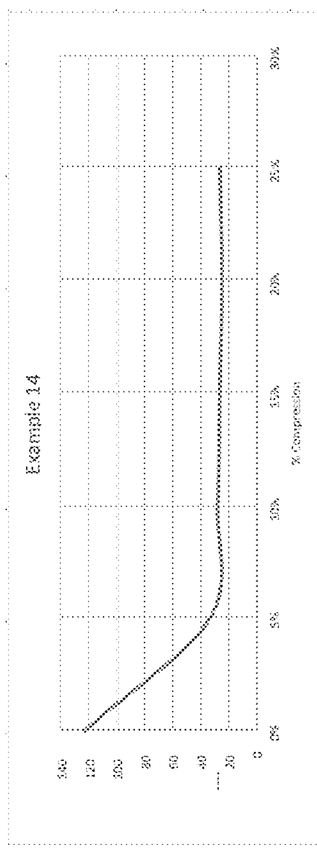
FIG. 2 is a series of graphical representations of volume resistivity against the percentage of compression applied to Samples 12-16 in Example 2 herein in O-ring form.
Figure 2:
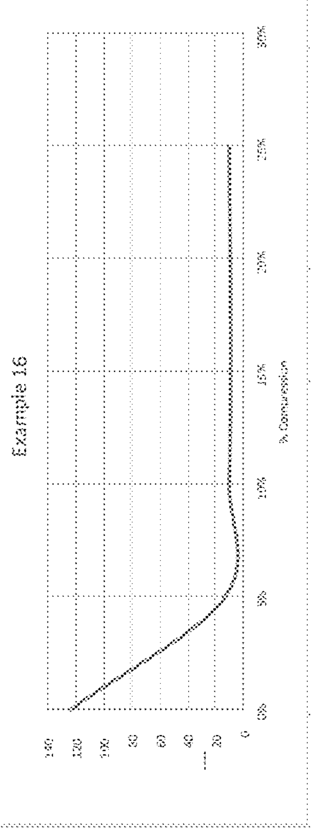
Figure 2:
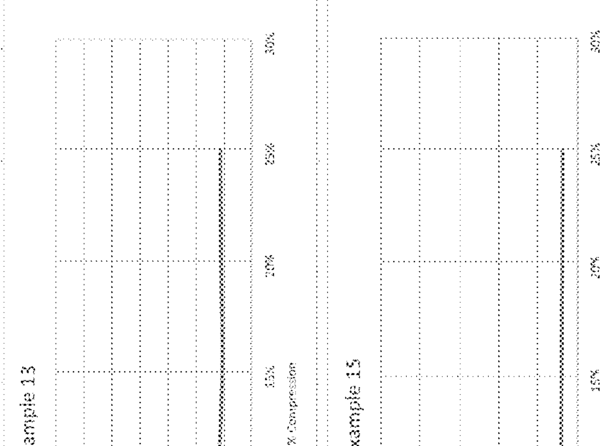
Figure 2:
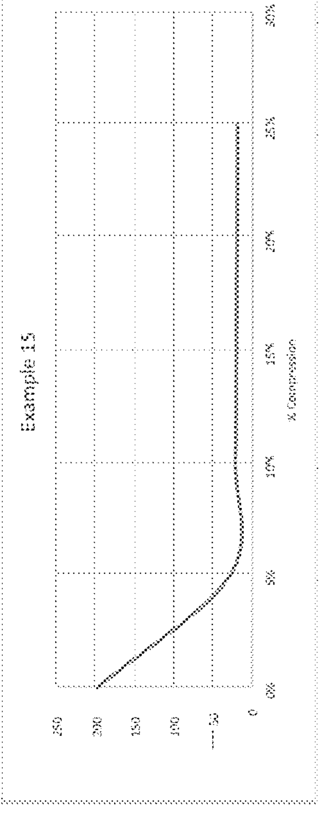
Figure 2:
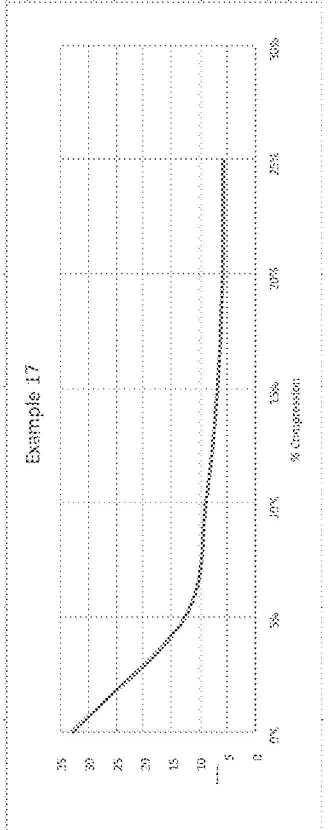

As can be seen in FIG. 2, for Samples 13-17, with no load applied, volume resistivity was found to decrease as the content of the carbon nanostructure additive increased. The QTC effect was apparent once a load was applied. When 5% deflection was applied, as shown also in FIG. 2, volume resistivity decreased by 4.5 times for Sample 13 having 4.8 parts by weight of the additive. Similar trends were observed for 4 Samples 14 to 17.

Figure 3:
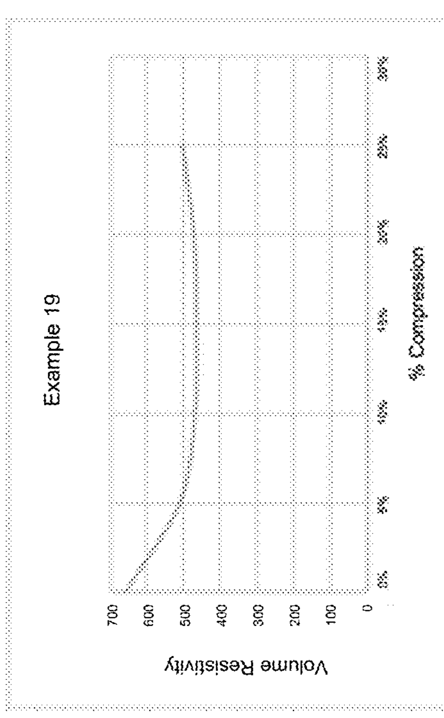
FIG. 3 is a series of graphical representations of volume resistivity against the percentage compression applied to Samples 17-20 of Example 2.
Figure 3:
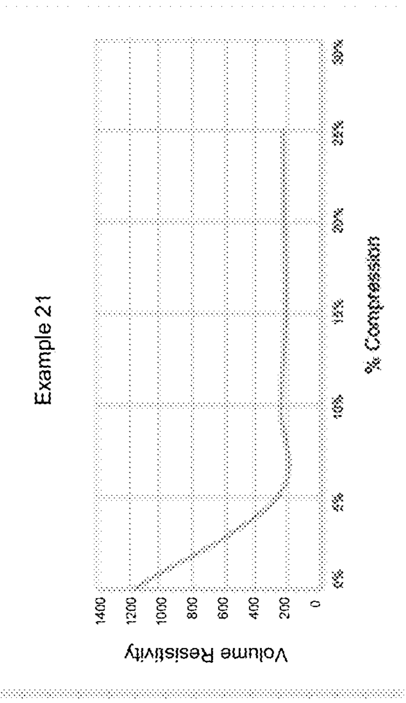
Figure 3:
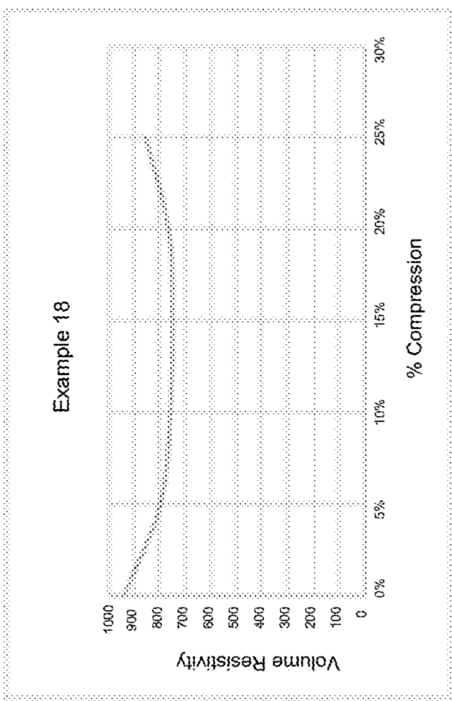
Figure 3:
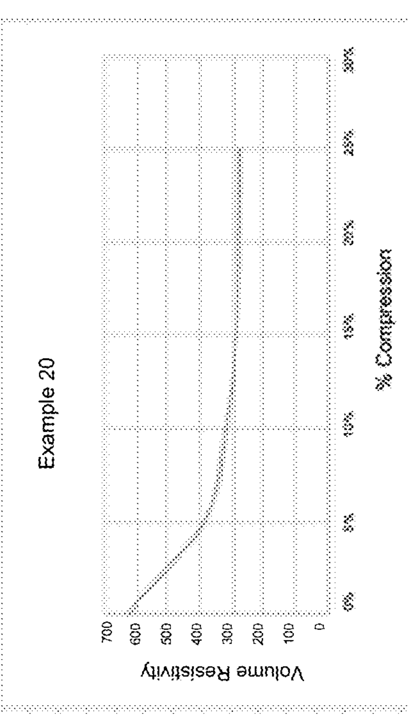

With reference to Samples 18 to 21 and FIG. 3, optimal QTC effects were achieved with this formulation at levels of 4.25 to 4.5 parts by weight of the carbon nanostructure additive per hundred parts by weight of the curable polymer in terms of QTC effects that would be useful in semiconductor valves for evaluation of seal erosion as a measure of resistance and compression set as a function of resistance. These properties are shown in FIG. 3 for those Samples 18 to 21. Sample 18 is the same formulation as Sample 13, but prepared and tested independently with Samples 19-21.

Figure 4:
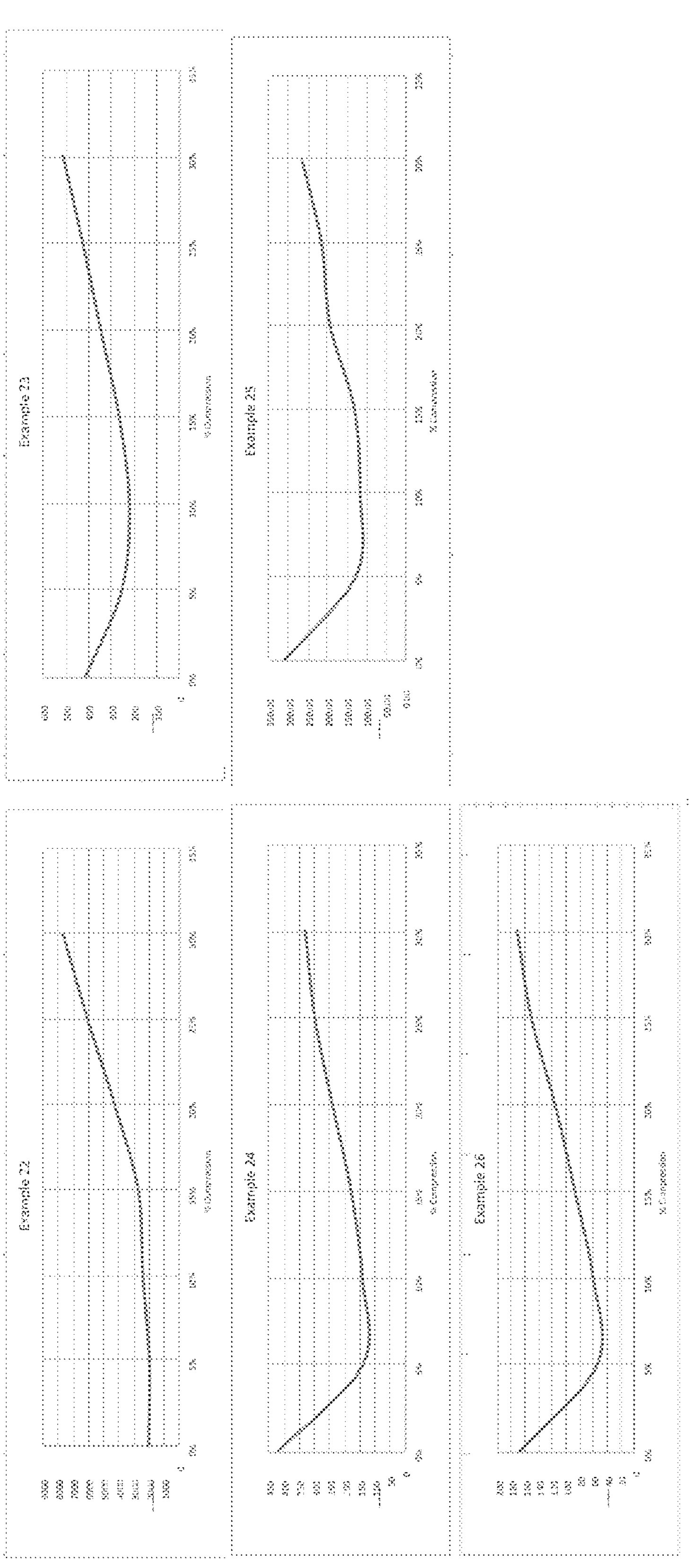
FIG. 4 is a series of graphical representations of volume resistivity for Samples 12-20 of Example 2 in button form.

When testing the buttons, and with reference to FIG. 4, button Samples 22-26 were tested, and made respectively from the compositions of Samples 13-17, it can be seen that volume resistivity decreases when the carbon nanostructure additive is increased by two times from 4.8 parts to 9.6 parts. At a constant level of carbon nanostructure additive, the volume resistivity initially decreases as the deflection is increased from 5 to 10%. When the deflection is increased beyond 10%, the volume resistivity increases.

EXAMPLE 3

In this Example, sample KF seals were prepared using compound formulations having carbon nanostructure additive in accordance with the invention. The seals were made in the ISO Standard 2861-1 size ISO40 (referred to herein as "KF-40" seals). These seals were subjected to conductivity testing.

QTC formulations listed below in Table 4 were prepared and tested to identity a preferred composite formulation to prepare a KF-40 composite seal. Compositions were formed using PFK-300 from Lodestar as in Example 1, which is a curable perfluoroelastomer polymer that was cured in this Example using a bisaminophenol (BOAP) curative. The Cabot carbon nanostructures in pellet form used in Examples 1 and 2 above, were incorporated in varying levels in this Example ranging from as measured in by parts by weight per 100 parts by weight of the PFK-300 base polymer. Additional fillers used in the first five samples made (Samples 27, 28, 29, 30 and 31) included 3 parts per hundred of the Austin Black 325 used in Example 2 (a non-conductive carbon filler useful for processability due to its platy structure), and 5 parts per hundred of the conductive thermal carbon black N-990 from Cancarb available as Thermax® which due to its particle size may be used without impeding the networked and interlinked structure of the carbon nanostructures within the cured polymer matrix.

The remaining Samples (Samples 32-40) were formed in the same manner as Samples 27-31, but did not include the Austin Black 325 or the Thermax® N-990 additives. Instead, the only filler was the Cabot carbon nanostructure pellets in amounts ranging from 4 to 12 parts per hundred parts of the base polymer PFK-300.

TABLE 4

| Components (phr) | 27 | 28 | 29 | 30 | 31 | 32 | 33 | 34 | 35 | 36 | 37 | 38 | 39 | 40 |
|---|---|---|---|---|---|---|---|---|---|---|---|---|---|---|
| PFK-300 | 100 | 100 | 100 | 100 | 100 | 100 | 100 | 300 | 100 | 100 | 100 | 100 | 100 | 100 |
| N-990 Black | 5 | 5 | 5 | 5 | 5 | — | — | — | — | — | — | — | — | — |
| Austin Black 325 | 3 | 3 | 3 | 3 | 3 | — | — | — | — | — | — | — | — | — |
| Cabot carbon nanostructure | 4 | 6 | 8 | 10 | 12 | 1 | 3 | 5 | 7 | 9 | 8 | 10 | 12 | 14 |
| BOAP | 1.2 | 1.2 | 1.2 | 1.2 | 1.2 | 1.2 | 1.2 | 1.2 | 1.2 | 1.2 | 1.2 | 1.2 | 1.2 | 1.2 |

Samples 32-40 were prepared by initially weighing the required ingredients separately in containers. A mill and mixer were preheated to 80° F. The PFK-300 base polymer was passed through the mill to create a thin sheet. BOAP (2,2-bis[3-amino hydroxyphenyl]hexafluoro-propane, which is also known as diamino-bisphenol AF) was added into the container including the Cabot carbon nanostructures and stirred until both ingredients were thoroughly mixed. The mixture of BOAP and carbon nanostructures was added slowly to the top of the sheet of polymer film while the mixer rotated at 15 RPM. All components were then mixed for 2 minutes or until the mixture temperature reached 160° F. The batch was then dropped from the mixer and sheeted on the mill at the nip. The mixture was cut and blended again on the mill for 1 minute and the cutting and blending was repeated 5 more times. After the 5th cycle, the material was again sheeted. After aging for 12 hours, the sheet was again passed through the mill 2 further times and then the sheet was removed. About five sample KF-40 seals were made from each sheet for testing by click-and-die procedures in which the material is cut with an ID/OD clicker die. The die-cut material was then cut to length and wrapped in a compression mold.

Figure 5:
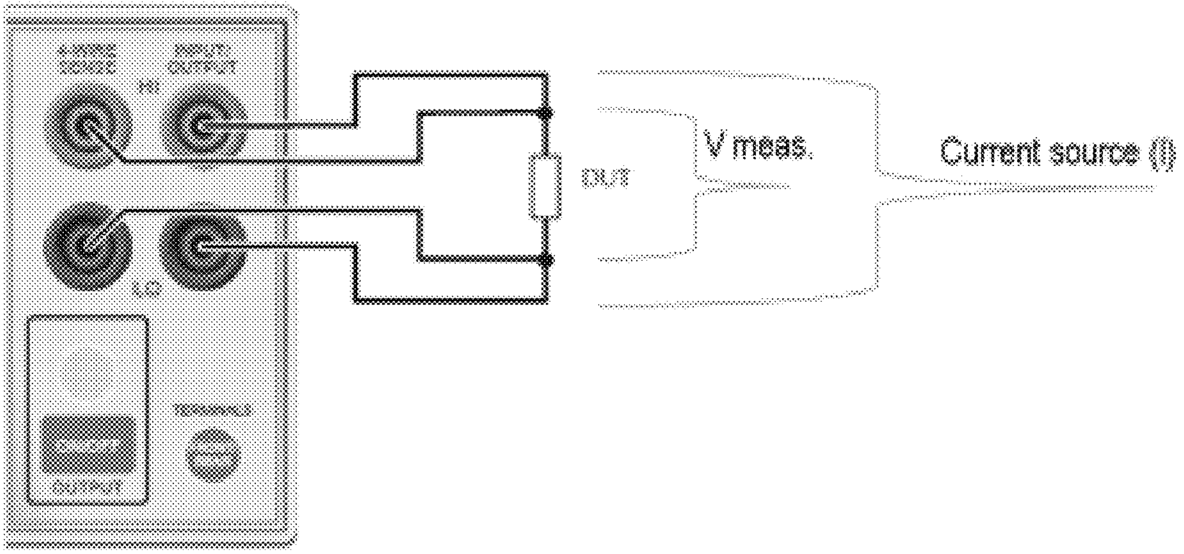
FIG. 5 is a circuit diagram for measuring resistance in Example 3.
Figure 6:
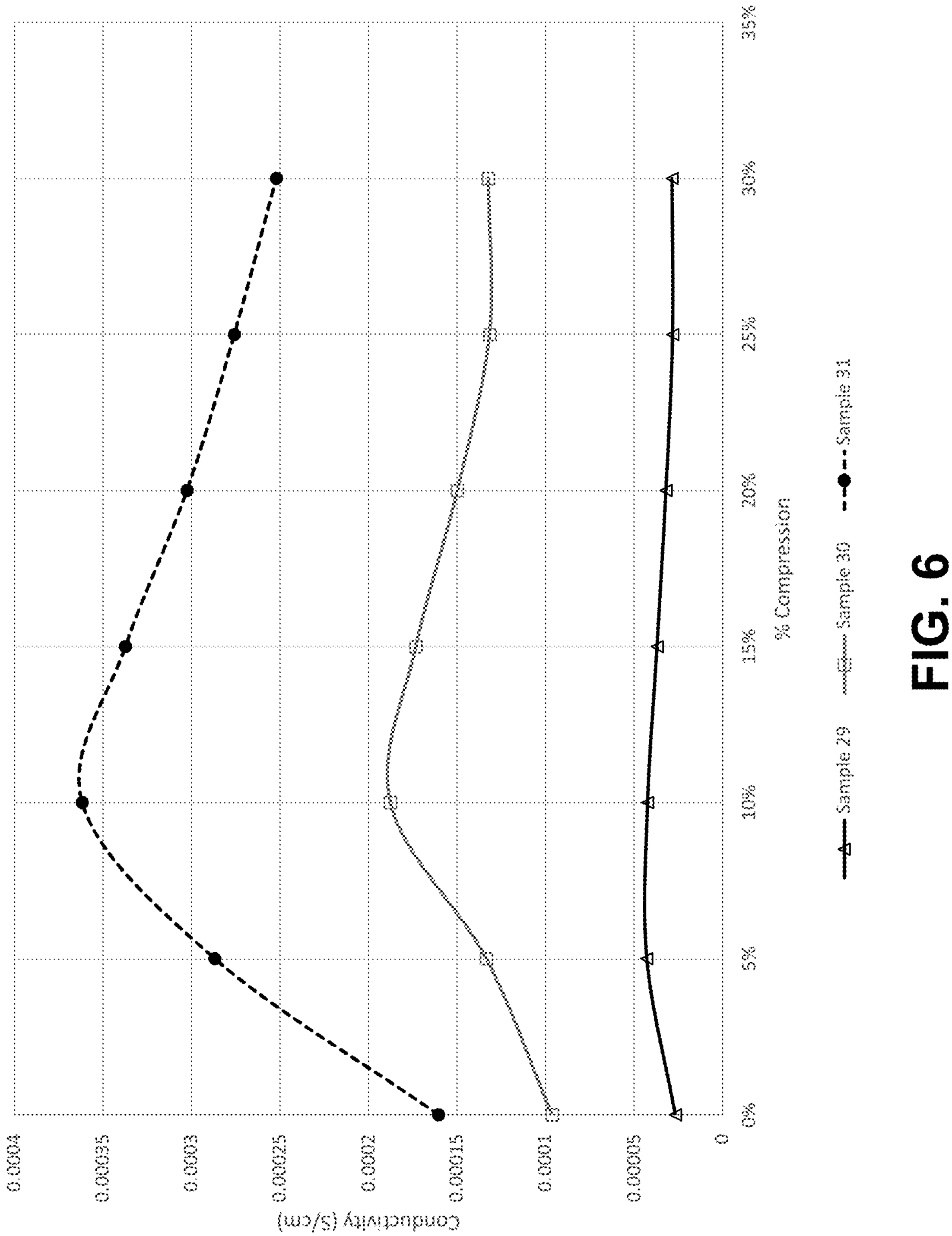
FIG. 6 is a graphical representation of the relationship between conductivity in Siemens/cm and the percentage of compression on Samples 29-31 of Example 3.
Figure 7:
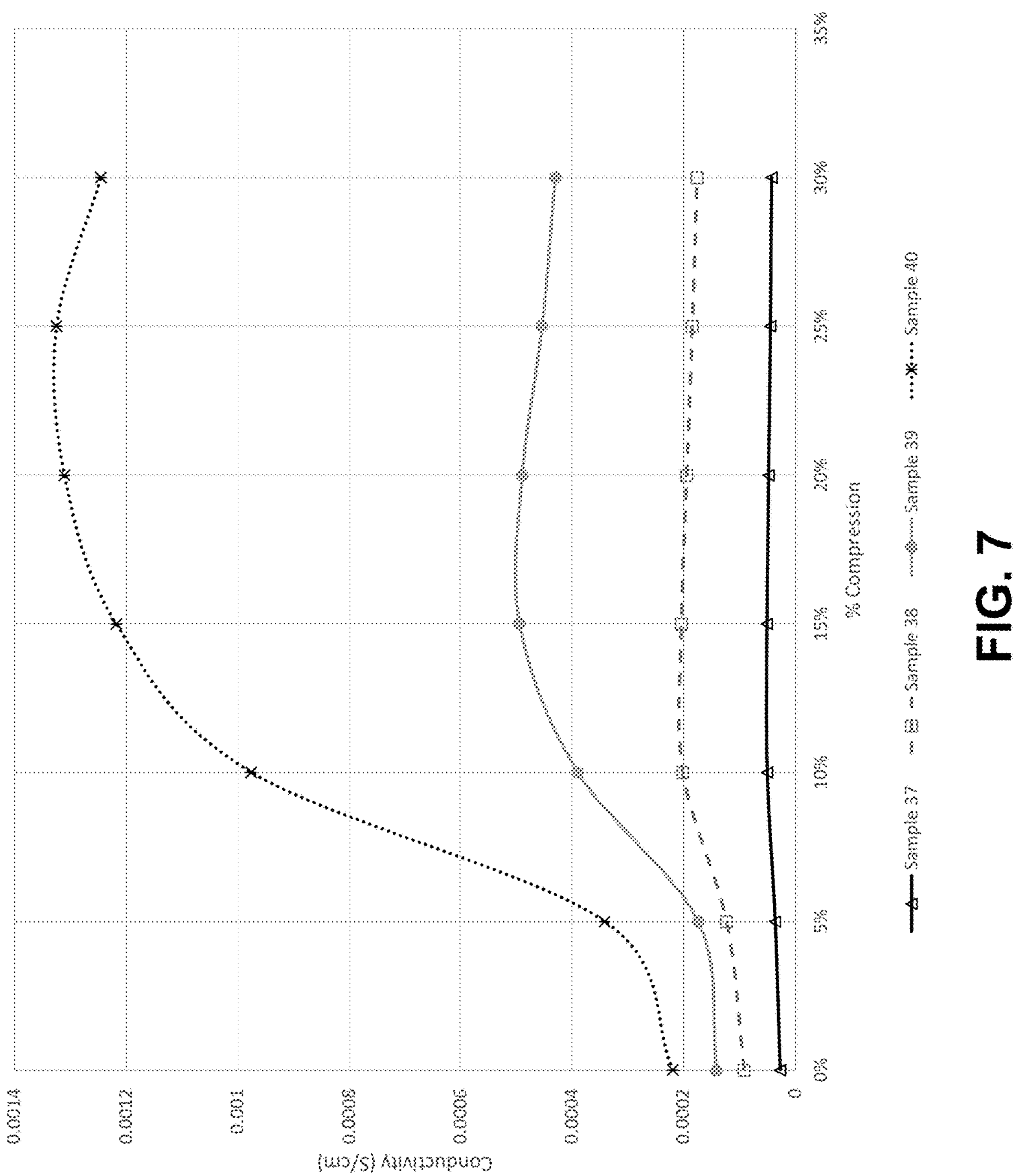
FIG. 7 is a graphical representation of the relationship between conductivity and percentage compression of Samples 37-40 of Example 3.
Figure 8:
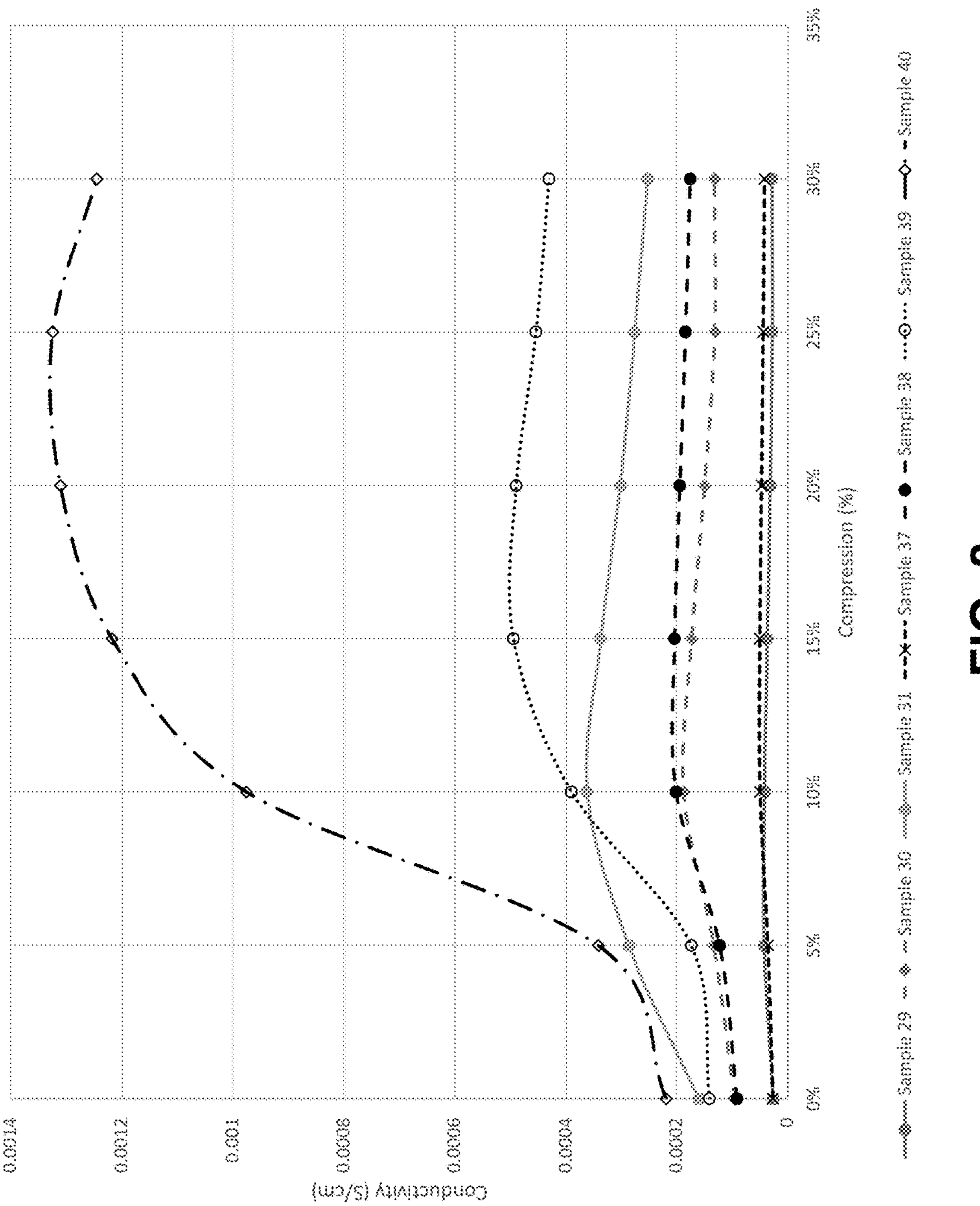
FIG. 8 is a graphical representation of the combined data from FIGS. 6 and 7 for Samples 29-31 and 37-40 of Example 3.

The conductivity/resistivity was measured using a 4-point probe arranged having the diagram noted in FIG. 5. Compression was applied to Samples 29-31 and Samples 37-40 from 0 to 30% as shown in FIGS. 6, 7 and 8. FIG. 6 shows samples having all three fillers in conductivity behavior at varying levels of carbon nanostructures 8, 10 and 12 parts per hundred from Samples 29-31 respectively. The conductivity rises to about 10% deflection and then levels back off. FIG. 7 demonstrates for Samples having only carbon nanostructure additives in amounts of from 8, 10, 12 and 14 parts per hundred, that a larger conductivity jump is shown in samples that are more highly loaded, but that all have conductivity increases between 5 and 15% compression which then begin to level off. However, the lower the value, the less the impact in the change in conductivity. FIG. 8 shows comparative behavior between the Samples having the carbon black fillers with the carbon nanostructures form Samples 29-31 and those having only the carbon nanostructures from Samples 37-40.

In all Samples, similar patterns of conductivity rise with deflection and then leveling off are achieved to demonstrate that the Samples were experiencing QTC composite effect under depression.

Alternatively, KF-40 seals for testing can be also made by extruding material using a 210 O-ring cross-section.

Figure 9:
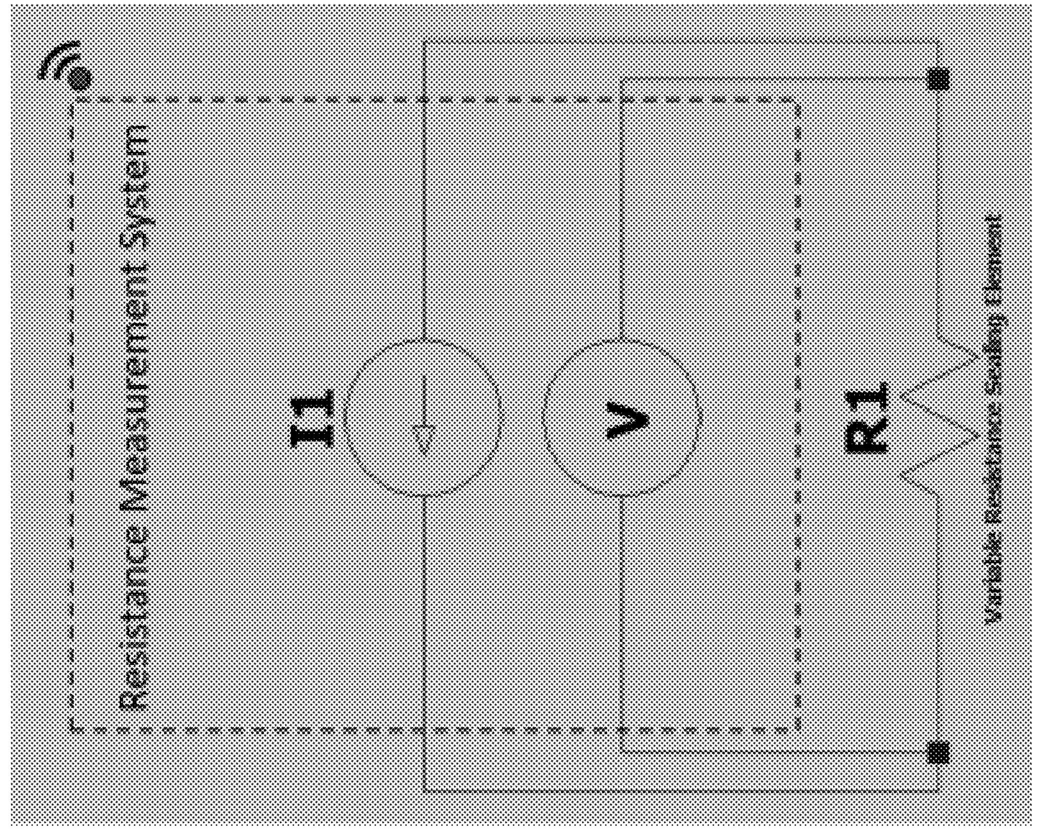
FIG. 9 is a representation of an example of a circuit to use with a four-point probe configuration for monitoring the variation in conductivity in a seal made according to the invention.

To use the compositions in a QTC smart seal, seals configured using the compositions herein such as those of Example 3 above, may be connected to, for example, a circuit that measures resistance to capture a change in the conductivity of the seal under compression. This data may be communicated by any suitable method, either hard-wired or through wireless communication. One example of a resistance system is shown in FIG. 9 for use with a four-point probe configuration, wherein four leads are connected and the resistance is communicated through the system to a resistance measurement system. The system may further be connected using a small, printed circuit board (PCB) in communication with the measured resistance over the seal, and an LED light may be used to indicate when proper compression is reached in an installation.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A self-sensing, elastomeric article having one of a dissipative effect and a quantum tunneling composite effect in an end application subject to compressive stress, wherein the self-sensing, elastomeric article is formed from a self-sensing, elastomeric article composition that comprises:

at least one matrix polymer comprising at least one curable polymer having at least one functional group for crosslinking, and a three-dimensional, branched and/or crosslinked carbon nanostructure additive, wherein the three-dimensional branched and/or crosslinked nanostructure additive is in the article in an amount such that in use and subject to compressive stress, the self-sensing, elastomeric article is (i) an insulator when not subjected to the compressive stress, and is conductive when subjected to the compressive stress, and/or (ii) a conductivity level of the self-sensing, elastomeric article when subjected to the compressive stress is different than a conductivity level of the self-sensing, elastomeric article when not subjected to the compressive stress so that the self-sensing, elastomeric article demonstrates one or more of a dissipative effect and a quantum tunneling composite effect, and wherein the self-sensing, elastomeric article has a change in conductivity level under the compressive stress in use that determines and evaluates performance of the self-sensing, elastomeric article in real time.

2. The self-sensing, elastomeric article according to claim 1, wherein the self-sensing, elastomeric article composition comprises about 1 part by weight to about 30 parts by weight of the carbon nanostructure additive per 100 parts by weight of the at least one matrix polymer.

3. The self-sensing, elastomeric article according to claim 2, wherein the self-sensing, elastomeric article composition comprises about 1 to about 15 parts by weight of the carbon nanostructure additive per 100 parts by weight of the at least one matrix polymer.

4. The self-sensing, elastomeric article according to claim 1, wherein the self-sensing, elastomeric article has a quantum tunneling effect, and wherein the self-sensing, elastomeric article composition comprises at least about 2 parts by weight of the carbon nanostructure additive per 100 parts by weight of the at least one matrix polymer.

5. The self-sensing, elastomeric article according to claim 4, wherein the self-sensing, elastomeric article composition comprises at least about 3 parts by weight of the carbon nanostructure additive per 100 parts by weight of the at least one matrix polymer.

6. The self-sensing, elastomeric article according to claim 5, wherein the self-sensing, elastomeric article composition comprises at least about 4 parts by weight of the carbon nanostructure additive per 100 parts by weight of the at least one matrix polymer.

7. The self-sensing, elastomeric article according to claim 6, wherein the self-sensing, elastomeric article composition comprises about 4 parts by weight to about 20 parts by weight of the carbon nanostructure additive per 100 parts by weight of the at least one matrix polymer.

8. The self-sensing, elastomeric article according to claim 7, wherein the self-sensing, elastomeric article composition comprises about 4 to about 15 parts by weight of the carbon nanostructure additive per 100 parts by weight of the at least one matrix polymer.

9. The self-sensing, elastomeric article according to claim 1, wherein the self-sensing, elastomeric article composition further comprises at least one conductive filler different from the carbon nanostructure additive that is selected from the group consisting of powders, flakes and fiber fillers comprising one or more of carbon, metal-plated glass, metal-plated particles, wherein the particle comprises a metal or a polymer, nickel-coated graphite, graphene, graphite, carbon black, graphene derivatives, single-wall carbon nanotubes, multi-wall carbon nanotubes, gold, silver, nickel, copper, and combinations or mixtures thereof.

10. The self-sensing, elastomeric article according to claim 9, wherein the self-sensing, elastomeric article composition comprises about 0.25 parts by weight to about 100 parts by weight of the at least one conductive filler different from the carbon nanostructure additive per 100 parts by weight of the at least one matrix polymer.

11. The self-sensing, elastomeric article according to claim 1, wherein the self-sensing, elastomeric article is an elastomeric quantum tunneling composite, and is selected from the group consisting of a seal, gasket, or other component in a sealing assembly.

12. The self-sensing, elastomeric article according to claim 1, wherein the self-sensing, elastomeric article is an elastomeric quantum tunneling composite, and wherein the self-sensing, elastomeric article is in electrical communication with a circuit and a voltage is applied to measure the change in conductivity-of the self-sensing, elastomeric article.

13. A method of making a self-sensing, elastomeric article wherein the self-sensing, elastomeric article is formed from a self-sensing, elastomeric article composition, comprising providing the self-sensing, elastomeric article composition comprising at least one matrix polymer comprising at least one curable polymer having at least one functional group for crosslinking and at least one carbon nanostructure additive that is three-dimensional, branched and crosslinked, wherein the at least one carbon nanostructure additive is present in an amount of about at least about 1 part by weight to about 30 parts by weight per 100 parts by weight of the at least one matrix polymer; and forming the self-sensing, elastomeric article from the self-sensing, elastomer article composition by curing and heat-forming the self-sensing, elastomeric article composition, wherein the article is a self-sensing, elastomeric article and when in an application subject to compressive stress is (i) an insulator when not subjected to the compressive stress, and is conductive when subjected to the compressive stress, and/or (ii) a conductivity level of the self-sensing, elastomeric article when subjected to the compressive stress is different than a conductivity level of the self-sensing, elastomeric article when not subjected to the compressive stress so that the self-sensing, elastomeric article exhibits at least one of a dissipative effect or a quantum tunneling effect, and the elastomeric, self-sensing article has a change in conductivity level when under the compressive stress in use that determines and evaluates performance of the self-sensing, elastomeric article in real time.

14. The method according to claim 13, wherein the self-sensing, elastomeric article is a seal, gasket, or other component in a sealing assembly.

15. The method according to claim 13, wherein the self-sensing, elastomeric article composition comprises at least one crosslinking additive for reacting with the at least one functional group for crosslinking.

16. The method according to claim 13, wherein the curable polymer is selected from the group consisting of a curable fluoropolymer, a curable perfluoropolyether, and a curable perfluoropolymer, and blends and copolymers, thereof.

17. The method according to claim 13, wherein the self-sensing, elastomeric article composition is an elastomeric quantum tunneling composite.

18. The method according to claim 13, wherein the conductivity level of the self-sensing, elastomeric article when subjected to the compressive stress is higher than the conductivity level of the self-sensing, elastomeric article when not subjected to the compressive stress.

19. The method according to claim 13, wherein the self-sensing, elastomeric article is an elastomeric quantum tunneling composite, and wherein, in use, the elastomeric, self-sensing article is in electrical communication with a circuit and a voltage is applied to measure the change in conductivity of the self-sensing, elastomeric article.

* * * * *